US007797851B2

(12) United States Patent
Funabashi et al.

(10) Patent No.: US 7,797,851 B2
(45) Date of Patent: Sep. 21, 2010

(54) SHAPE MEASUREMENT DEVICE PROBE AND SHAPE MEASUREMENT DEVICE

(75) Inventors: Takanori Funabashi, Osaka (JP); Keiichi Yoshizumi, Osaka (JP)

(73) Assignee: Panasonic Corporation, Osaka (JP)

( * ) Notice: Subject to any disclaimer, the term of this patent is extended or adjusted under 35 U.S.C. 154(b) by 531 days.

(21) Appl. No.: 11/919,557

(22) PCT Filed: May 8, 2007

(86) PCT No.: PCT/JP2007/059510

§ 371 (c)(1), (2), (4) Date: Oct. 30, 2007

(87) PCT Pub. No.: WO2007/135857

PCT Pub. Date: Nov. 29, 2007

(65) Prior Publication Data

US 2010/0011601 A1 Jan. 21, 2010

(30) Foreign Application Priority Data

May 18, 2006 (JP) ............................ 2006-138886

(51) Int. Cl.
*G01B 5/016* (2006.01)
*G01B 7/016* (2006.01)

(52) U.S. Cl. ........................................................ 33/561

(58) Field of Classification Search .................... 33/561
See application file for complete search history.

(56) References Cited

U.S. PATENT DOCUMENTS 4,513,507 A * 4/1985 Laskowski ................... 33/558

(Continued)

FOREIGN PATENT DOCUMENTS

EP 0 471 371 2/1992

(Continued)

OTHER PUBLICATIONS

Patent Cooperation Treaty (PCT) International Preliminary Report on Patentability, issued Dec. 10, 2008 in International Application No. PCT/JP2007/059510.

(Continued)

*Primary Examiner*—Christopher W Fulton
(74) *Attorney, Agent, or Firm*—Wenderoth, Lind & Ponack, L.L.P.

(57) ABSTRACT

There are provided a shape measurement device capable of measuring shapes irrespective of an inclined direction of a side surface without using a complex device configuration, and a shape measurement device probe arranged in the shape measurement device. In the shape measurement device probe, a connecting mechanism for connecting an attachment member and a swinging member includes a supporting point member arranged on the swinging member and a mounting platform arranged on the attachment member, and connects the swinging member to the attachment member so as to be inclinable in any direction. The attachment member and the swinging member are configured such that a movable side member arranged on the swinging member and a fixed side member arranged on the attachment member generate magnetic attraction force in a non-contacting state with respect to each other, where the arm of the swinging member is biased so as to be directed in the vertical direction by the magnetic attraction force. According to this configuration, a side surface shape inclined in any direction of XY directions and substantially parallel to the Z-direction can be measured.

13 Claims, 17 Drawing Sheets

U.S. PATENT DOCUMENTS 5,041,806 A * 8/1991 Enderle et al. .............. 335/295
5,174,039 A 12/1992 Murai
5,327,657 A 7/1994 Hajdukiewicz et al.
5,345,690 A * 9/1994 McMurtry et al. ............ 33/561
5,404,649 A 4/1995 Hajdukiewicz et al.
5,778,552 A 7/1998 LeGuin
6,430,828 B1 * 8/2002 Ulbrich ....................... 33/503
6,526,672 B1 * 3/2003 Danielli et al. ................ 33/561
7,055,258 B2 * 6/2006 Hajdukiewicz et al. ....... 33/559
7,127,825 B2 * 10/2006 McMurtry et al. ............ 33/556
7,284,337 B2 * 10/2007 Brenner et al. ................ 33/558
2004/0163268 A1 * 8/2004 McMurtry et al. ............ 33/556
2008/0148588 A1 * 6/2008 Yoshizumi et al. ............ 33/561

FOREIGN PATENT DOCUMENTS

GB 2238616 A * 6/1991
JP 63-128405 8/1988
JP 6-501776 2/1994
JP 3075981 6/2000
JP 2004-93192 3/2004
JP 2006-284410 10/2006

OTHER PUBLICATIONS

Supplementary European Search Report (in English language) issued May 12, 2010 in corresponding European Patent Application No. 07 74 2945.

* cited by examiner

SHAPE MEASUREMENT DEVICE PROBE AND SHAPE MEASUREMENT DEVICE

TECHNICAL FIELD

The present invention relates to a shape measurement device probe and a shape measurement device for performing scan-measuring with high precision and low measuring force of the measurement of the inner surface and hole diameter of a hole having any three-dimensional shape, shape measurement of an external surface having any shape, and the like.

BACKGROUND ART

A conventional probe capable of measuring an external surface, an internal surface, a hole diameter, and the like of a measuring object is disclosed in Japanese Patent No. 3075981 (patent document 1). FIG. 18A and FIG. 18B are diagrams showing a configuration of a conventional three-dimensional shape measurement device probe 310 disclosed in patent document 1. The probe 310 is a probe for measuring a side surface extending in a vertical direction or substantially vertical direction of the measuring object, and cannot measure the surface extending in a horizontal direction or substantially horizontal direction.

The measuring operation is carried out as below with the probe 310. In FIG. 18A, when the probe 310 moves in YZ directions with respect to a surface to be measured S, an arm 303 with a stylus 301 tilts along a substantially X direction according to the displacement of the surface to be measured S in the X direction. Laser light is irradiated from a semiconductor laser light emitting unit 306 to a mirror 302 on an upper surface of the arm 303, and the tilt of the arm 303 is detected by light position detecting means 307 based on reflected light from the mirror 302. The entire probe 310 is moved in the X direction so that the detected tilt becomes constant, an X coordinate measurement value of the entire probe 310 is obtained from the movement amount, and a displacement amount of the stylus 301 detected by the light position detecting means 307 is added to the X coordinate measurement value, so that an X coordinate indicating the displacement amount of the surface to be measured S in the X direction is measured with high precision. Thus, the position in the Y direction of the measuring object cannot be measured with the probe 310 due to its structure.

In view of such a problem, the applicant filed an application relating to a probe capable of measuring the hole shape and the surface shape of a measuring object and of being inclined in any horizontal direction (Japanese Patent Application No. 2005-105915, issued as Japanese Unexamined Patent Publication No. 2006-284410). FIG. 19 shows a structure of the shape measurement device probe disclosed in the application.

In FIG. 19, a shape measurement device probe 351 is arranged in a shape measurement device 371, and a measuring surface contacting member 360 with a stylus 361 is connected so as to swing in any direction of the horizontal direction with a supporting point 363 as the center with respect to an attachment member 362. A connecting member 364 is made up of a coil spring, and supports a central axis of the measuring surface contacting member 360 in a vertical direction during non-measurement time and generates force to press the stylus 361 against the measuring object during measurement time. As shown in FIG. 20, the tilt about the X, Y axes of a mirror 365 fixed on an upper part of the measuring surface contacting member 360 is detected by an inclined angle detecting part 366. The entire probe 351 is operated by the shape measurement device 371 with respect to the measuring surface so that the press-in amount of the stylus becomes constant, and furthermore, the XYZ positions of the probe 351 are detected and the values thereof are added to the displacement of the stylus in the horizontal direction converted from the tilt of the mirror 365 to detect the position of the stylus with high precision. According to such a configuration, the surface in any direction of the measuring object can be measured without rotating the measuring object.

DISCLOSURE OF THE INVENTION

Problems to be Solved by the Invention

However, in the configuration disclosed in patent document 1, the stylus 301 can swing only in one direction of horizontal direction, and a cylindrical surface had to be rotated in order to measure the shape of the entire periphery of the cylindrical surface having a vertical axis as the central axis. Thus, a mechanism for rotating the measuring object was necessary, where a core shift of the central axis of the rotation mechanism becomes a measurement error. The method of rotating the measuring object also had a problem that the surface to be measured having a complicated cross section cannot be measured.

In the configuration of Japanese Patent Application No. 2005-105915 (issued as Japanese Unexamined Patent Publication No. 2006-284410), the stylus 361 can be inclined in any horizontal direction, but the supporting point with respect to the attachment member 362 of the measuring surface contacting member 360 moves in the horizontal direction, since the force of the coil spring or the connecting member 364 has to be weakened, which causes a movement error. To cope with this, a sensor for horizontal movement direction may be arranged to correct the movement error, but the configuration becomes complicated. Furthermore, since the coil spring is used, force slightly larger than the force to lift the weight of the measuring surface contacting member, that is, the force of pressing against a workpiece such as force greater just by 30 mgf has to be generated, and the adjustment thereof is difficult.

It is an object of the present invention to overcome such issues and to provide a shape measurement device probe in which a stylus is configured to swing in any horizontal direction while the stylus is held at a neutral position during non-measurement time and generates very small measuring pressure on a measuring object during measurement time, and in which the supporting point position for the swing of the stylus is less likely to shift and can be easily adjusted with a simple configuration; and a shape measurement device.

Means for Solving the Problems

The present invention is configured as below to achieve the above aim.

According to a first aspect of the present invention, there is provided a shape measurement device probe including a measuring surface contacting unit including an arm and a stylus arranged at a distal end of the arm, for contacting a surface to be measured of a measuring object; an attachment member for attaching the measuring surface contacting unit to the shape measurement device; a connecting mechanism, including a supporting point member arranged in the measuring surface contacting unit and a mounting platform fixed to the attachment member and to be mounted with the supporting point member, for connecting the measuring surface contacting unit and the attachment member in a swinging manner with the supporting point member as a supporting point; and a biasing mechanism including a movable side member arranged on the measuring surface contacting unit and a fixed side member arranged on the attachment member, arranged to face each other in a vertical direction, the movable side member and the fixed side member being configured to generate magnetic attraction force in a non-contacting state, the biasing mechanism biasing the measuring surface contacting unit so that the arm is directed in the vertical direction by the magnetic attraction force.

In such a configuration, one of the movable side member and the fixed side member may be configured by a permanent magnet and the other may be configured by a magnetic body.

Furthermore, both the movable side member and the fixed side member may be configured by permanent magnets, and may be arranged so that different poles face each other.

Moreover the supporting point member may be configured as a projection of a needle shape; and the mounting platform may include a circular cone-shaped groove into which a distal end of the supporting point member is fitted, the measuring surface contacting unit and the attachment member being connected in a swinging manner with a contacting portion of a deepest portion of the circular cone-shaped groove and a pointed end of the supporting point member as a center of the swing.

The measuring surface contacting unit may include a main part provided with a through hole extending in a lateral direction at the middle, the arm being fixed to a lower wall on an outer side of the main part and the supporting point member being suspended from an upper wall on an inner side in the through ole of the main part; and the mounting platform may extend through the through hole.

The measuring surface contacting unit may include an extending part extending to a side opposite to the stylus with respect to the supporting point member, and a movable side holding part arranged at a distal end of the extending part, for holding the movable side member; and the attachment member may include, on an internal surface of a tubular main body, a fixed side holding part arranged on the same side as the supporting point member with respect to the movable side holding part, for holding the fixed side member.

The movable side holding part may be configured into a ring shape and may hold a plurality of movable side members at intervals at a lower surface side; and the fixed side holding part may hold a plurality of fixed side members in correspondence to each movable side member at a position facing each movable side member in the vertical direction.

The attachment member may include a regulating member for regulating a swinging width of the measuring surface contacting unit by contacting the measuring surface contacting unit on an internal surface of the tubular main body.

According to a second aspect of the present invention, there is provided a shape measurement device including the shape measurement device probe according to the first aspect including a mirror for reflecting measurement laser light at the measuring surface contacting unit of the shape measurement device probe; a laser light generator for generating the measurement laser light irradiated to the shape measurement device probe to obtain positional information of a measurement point at a surface to be measured of a measuring object; and a measurement point information determining unit for detecting an inclined angle of the measuring surface contacting unit of the shape measurement device probe based on reflected light reflected by the mirror arranged in the shape measurement device probe.

In the second aspect, the measurement point information determining unit may include an inclined angle detecting part for detecting the inclined angle, a stylus position calculating part for converting an angle signal obtained from the inclined angle detecting part to a displacement amount of the stylus with respect to the attachment member arranged in the shape measurement device probe, a position coordinate measuring part for obtaining a relative position coordinate value of the measurement point with respect to the attachment member using the measurement laser light, and an adder for adding the displacement amount of the stylus to the relative position coordinate value and obtaining positional information of the measurement point.

A stage that moves a relative position of the attachment member and the measuring object two-dimensionally or three-dimensionally along the surface to be measured, and a control device for controlling the operation of the stage such that the magnitude of the angle signal is substantially constant and the measuring surface contacting member including the stylus can be inclined in any direction may be further arranged.

In the second aspect, the inclined angle detecting part may include a light detector for receiving the reflected light, the light detector including one light receiving surface divided into a plurality of light receiving regions for independently performing photoelectric conversion.

The measurement laser light may be oscillation frequency stabilizing laser light, and a light separator for separating the reflected light into two, irradiating one of the separated light to the light detector and irradiating the other light to the inclined angle detecting part arranged in the position coordinate measuring part for measuring the position of the stylus in the Z-direction along an optical axis of the measurement laser light irradiated to the mirror, may be further arranged.

According to a third aspect of the present invention, there is provided a shape measurement device including the shape measurement device probe according to the first aspect; a plurality of position detecting sensors arranged on an internal surface of the cylindrical main body of the attachment member for detecting a distance with the measuring surface contacting unit; and a measurement point information determining unit for detecting an inclined angle of the measuring surface contacting unit of the shape measurement device probe based on an output from the plurality of position detecting sensors and obtaining positional information of the measurement point.

Furthermore, the position detecting sensors may be arranged at two locations so as to form an angle of 90° with respect to a center position of the main body of the attachment member.

Effect of the Invention

According to the shape measurement device probe of the first aspect of the present invention and the shape measurement device of the second and third aspects, the measuring surface contacting unit and the attachment member are connected in a swinging manner by the connecting mechanism, and the measuring surface contacting unit that can be inclined in any horizontal direction can be biased so that the arm is directed in the vertical direction in a non-contacting manner using magnetic force of the magnets to hold the orientation. Therefore, the force at which the stylus presses against the measuring object, that is, the measuring force is generated in an extremely small amount, and thus an error of extremely small force by the contacting force as with the coil spring is small and damage by accidental impact is also reduced. Thus, the axis of the stylus is not limited to the vertical direction and can be used in a tilted state, whereby measurement of the surface of the internal surface and the hole diameter of the hole having any shape, the measurement of the shape of the external surface, and the like can be performed through scan-measuring with high precision and low measuring force.

The attachment member and the measuring surface contacting unit are connected by the connecting mechanism having a configuration in which the supporting point member is mounted on the mounting platform, and thus do not slip-off due to gravity.

If at least one of the fixed side member and the movable side member is configured by a permanent magnet, the attraction force can be exerted, and furthermore, since current need not be applied as in an electromagnet, the configuration is simplified and there is no influence by electric heat.

The positional shift of the supporting point can be prevented by adopting a supporting point formed by the circular cone-shaped groove and the pointed end as the connecting mechanism. Furthermore, according to the configuration of holding the movable side member at the distal end of the extending part and holding the fixed side member on the supporting point side with respect to the movable side holding part, there can be obtained a configuration of pressing down the supporting point formed by the circular cone-shaped groove and the pointed end in the connecting mechanism by the attraction force of the magnets. Therefore, a positional shift of the supporting point is less likely to occur.

According to the configuration of passing a rod-shaped mounting platform through the through hole formed in the main body of the measuring surface contacting unit, the slip-off of the measuring surface contacting unit and the attachment member is reliably prevented.

Orientation holding can be performed through biasing to return to a neutral position with respect to a positional shift in the rotating direction having a point of the supporting point member as the center by arranging the fixed side members and the movable side members, each forming a pair, with spacing in between so as face each other in the vertical direction.

BRIEF DESCRIPTION OF THE DRAWINGS

The invention, together with objects and features thereof, may best be understood by the following description of preferred embodiments with reference to the accompanying drawings in which.

BEST MODE FOR CARRYING OUT THE INVENTION

Figure 1:
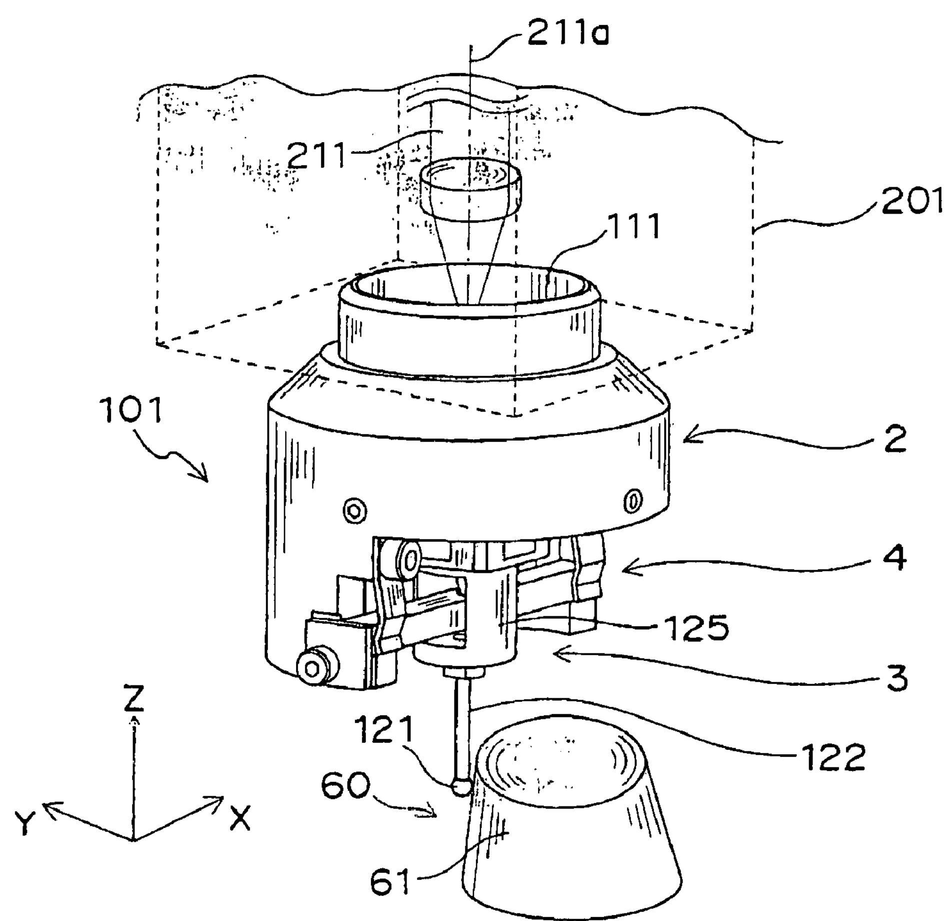
FIG. 1 is a perspective view of a shape measurement device probe used in a shape measurement device according to a first embodiment of the present invention.

Before continuing with the description of the present invention, it should be noted that the same reference numerals denote the same components throughout the drawings. A shape measurement device according to a first embodiment of the present invention, a shape measurement device probe arranged in the shape measurement device and the shape measurement device will be described in detail below with reference to the drawings.

The shape measurement device is a device that can measure the outer shape of a hole and a surface shape having any shape, which could not conventionally be measured with satisfactory precision, with high precision of nanometer order and low measuring force in a short period of time. The measuring object includes the hole shape of a bearing of a motor, a nozzle in an ink jet printer, a fuel ejection nozzle in an automobile engine and the like, for which an extremely high precision is demanded, and furthermore, the measuring object also includes the shape of a groove part formed in a fluid bearing and accommodating lubricant agent, and the inner diameter, the cylindricality, and the like of a micro-air slide arranged in the shape measurement device. The measuring object also includes a trench portion in a semiconductor circuit pattern.

The surface to be measured that can be measured with the shape measurement device equipped with the shape measurement device probe is a surface having an angle of 0 degrees to a maximum of about 30 degrees at an intersecting angle θ of the tangential line direction and the perpendicular direction at the surface to be measured.

First, the shape measurement device probe will be described. FIG. 1 is a perspective view of the shape measurement device probe used in the shape measurement device according to the first embodiment of the present invention. The shape measurement device probe 101 shown in FIG. 1 is arranged in the shape measurement device 201, and includes a portion that contacts the surface to be measured 61 of a measuring object 60 to be measured. The arm 303 can be inclined only in one direction along the X direction in the conventional probe 301 disclosed in patent document 1, whereas an arm 122 can be inclined in any direction whichever in the X or Y direction in the present probe 101. Such a probe 101 includes an attachment member 2, a swinging member 3 serving as one example having a function of a measuring surface contacting unit, and a connecting mechanism 4.

The attachment member 2 is a block member fixed or removably attached to the shape measurement device 201. The attachment member 2 is a fixed member, as opposed to the swinging member 3 that swings, and a laser light opening 111 that passes through the attachment member 2 is formed at a central portion to allow measurement laser light 211 irradiated from the shape measurement device 201 to pass through.

Figure 2:
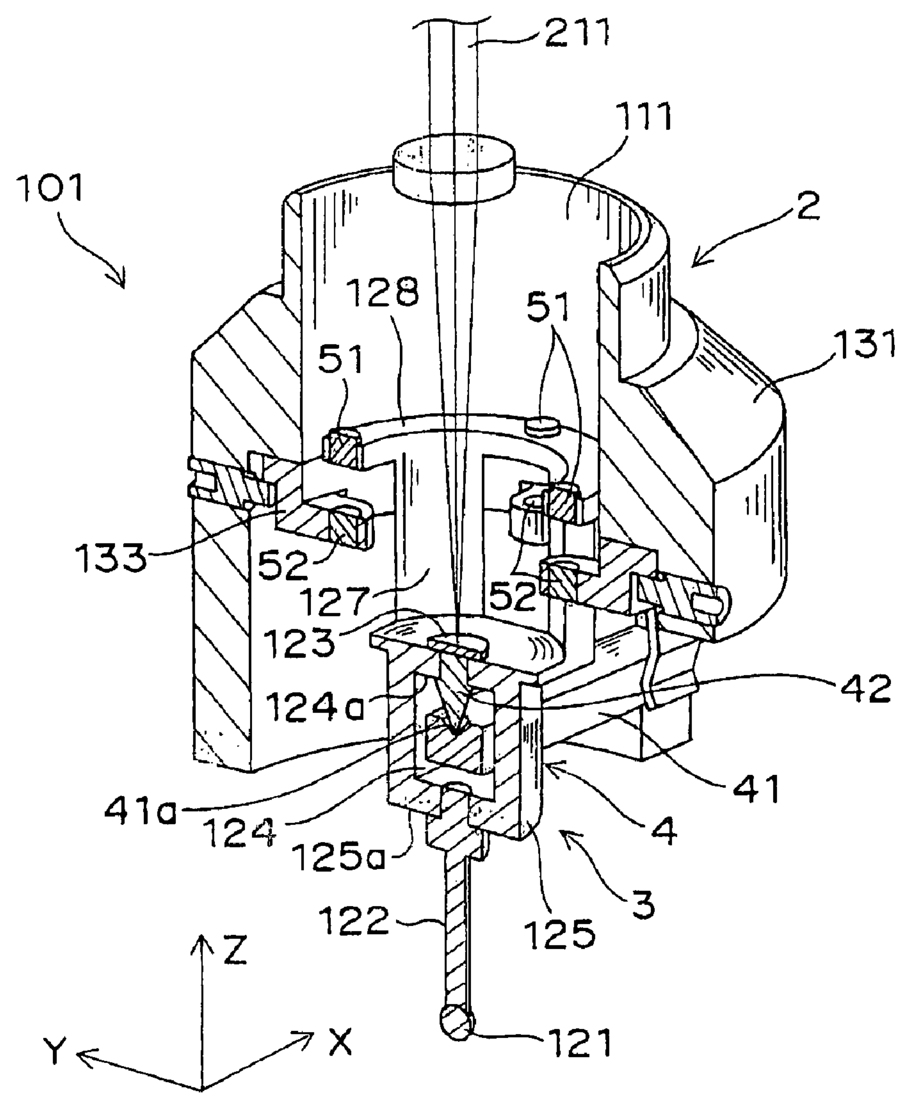
FIG. 2 is a perspective view when the shape measurement device probe in FIG. 1 is cut at a symmetric plane.

FIG. 2 is a perspective view when the shape measurement device probe in FIG. 1 is cut at a symmetry plane. The attachment member 2 has a cylindrical shape, and has a positional relationship such that the swinging member 3 can be accommodated therein. The swinging member 3 and the attachment member 2 are connected by the connecting mechanism 4, as described above. The connecting mechanism 4 is a mechanism for supporting the swinging member 3 on the attachment member 2 while inclining the swinging member 3 so as to be swingable in any direction intersecting an optical axis 211*a* of the measurement laser light 211 irradiated on the mirror 123. In the present embodiment, the optical axis 211*a* coincides with a Z-axis direction or a vertical direction.

In the present embodiment, the connecting mechanism 4 is configured by a mounting platform 4 having a rectangular column shape fixed to the attachment member 2 and a supporting point member 42 attached to the swinging member 3. The mounting platform 41 has a groove 41*a* of a circular cone shape formed in the upper surface, where a pointed end of the supporting point member 42 is fitted into the groove 41*a*. In fitting, the pointed end position of the supporting point member 42 contacts the lowest point of the circular cone-shaped groove of the mounting platform 41. According to such a configuration, the swinging member 3 and the attachment member 2 can be connected in a swinging manner with the contacting portion of the supporting point member 42 and the circular cone-shaped groove 41*a* as the center of swing. The swinging member 3 is preferably configured so that the center of gravity is positioned on the lower side in the vertical direction of the distal end of the supporting point member 42 such that the arm 122 is directed in the vertical direction when the supporting point member 42 is fitted into and connected to the groove 41*a* of the mounting platform 41.

Figure 3:
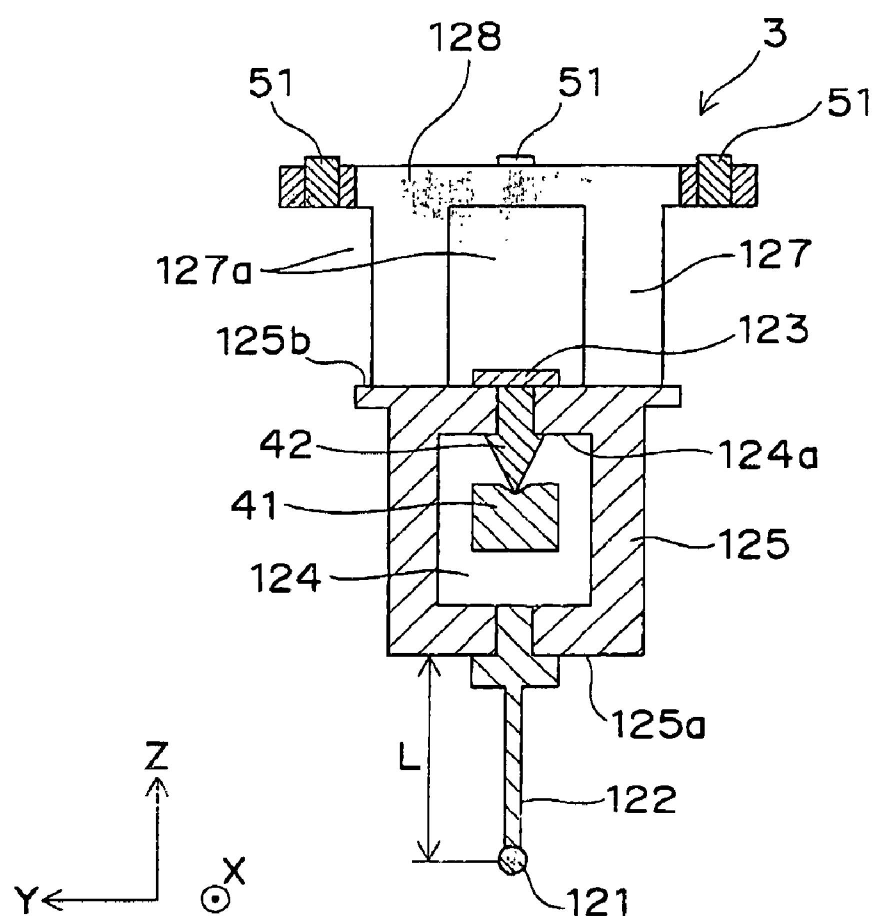
FIG. 3 is a cross sectional view when a swinging member of the shape measurement device of FIG. 1 is cut along the YZ plane.

FIG. 3 is a cross sectional view when the swinging member of the shape measurement device probe of FIG. 1 is cut along a YZ plane. The swinging member 3 is a member which includes a mirror 123 for reflecting the measurement laser light 211 passed through the stylus 121 that contacts the surface to be measured 61 of the measuring object 60 and the attachment member 2, and which swings with respect to the attachment member 2 in correspondence to the displacement of the stylus 121 according to the shape of the surface to be measured 61. The mirror 123 is fixed at the central portion of the swinging unit 3 and receives the measurement laser light 211 emitted from the shape measurement deice 101.

In the present embodiment, the swinging member 3 includes a main body 125 with a through hole 124 formed to penetrate in an X-axis direction (not shown) at the middle, where the arm 122 arranged with the stylus 121 at the distal end is suspended from a lower wall on the outer side of the main body 125, that is, a lower surface 125*a* of the main body 125. The mirror 123 is attached to the upper surface of the main body.

The supporting point member 42 of a needle shape is arranged on an upper wall on the inner side of the main body 125, that is, an upper surface 124*a* of the through hole 124. The mounting platform 41 of the connecting mechanism 4 is arranged to pass through the through hole 124 of the main body 125. Therefore, the swinging member 3 and the attachment member 2 are reliably prevented from slipping out In the present embodiment, the stylus 121 is, for example, a sphere body having a diameter of about 0.3 mm to about 2 mm, and the arm 122 is, for example, a rod-shaped member having a thickness of about 0.7 mm and the length L of about 10 mm from the lower surface of the main body 125, to which the arm is fixed, to the center of the stylus 121. Such values are appropriately changed according to the shape of the surface to be measured 61. The configuration of the swinging member 3 is not limited to the above configuration as long as it can be arranged in a swinging manner to the mounting platform 41 by the supporting point.

Extending parts 127 extending in the Z-axis direction are arranged at four locations on the peripheral edge of the upper surface 125*b* of the main body 125. The adjacent extending parts 127 are arranged with a gap 127*a* in between, and a projection 1332 of a fixed side member 52 to be described later is arranged in the gap 127*a* (see FIG. 5).

A movable side holding part 128 is arranged at the distal end of the extending part 127. The movable side holding part 128 is a ring-shaped member that projects out from the extending part 127 in the XY axes direction. Movable side magnets 51 serving as one example of the movable side member are arranged at four locations at even intervals on the same radius on the movable side holding part 128. The movable side magnets 51 are arranged at positions correspond to the gaps 127*a* between the adjacent extending parts 127.

Figure 4:
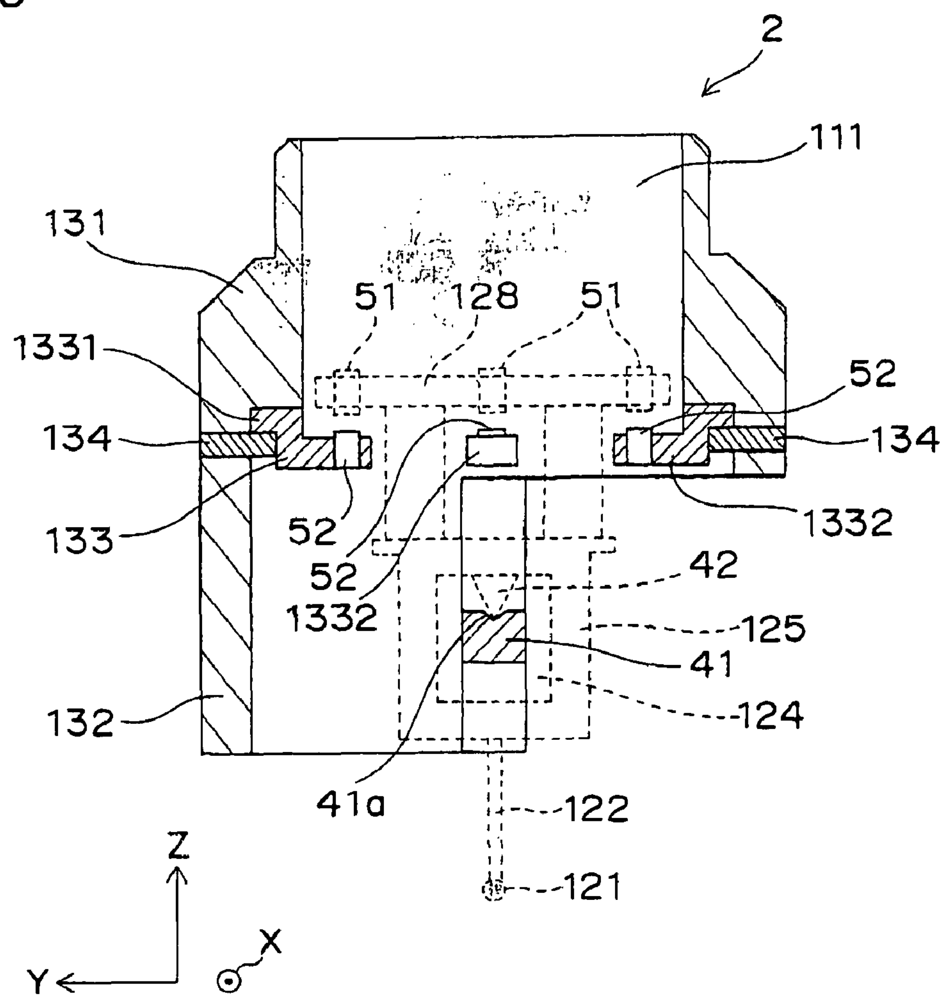
FIG. 4 is a cross sectional view when an attachment member of the shape measurement device of FIG. 1 is cut along the YZ plane.

FIG. 4 is a cross sectional view when the attachment member of the shape measurement device probe of FIG. 1 is cut at the YZ plane. The attachment member 2 includes a fixed side holding member 133 for attaching a cylindrical main body 131 and a fixed side magnet 52 serving as one example of the fixed side member. The main body 131 has a laser light opening 111 at the middle, as described above. The lower end of the main body is a mounting platform attachment part 132. The mounting platform attachment part 132 fixes the mounting platform 41 to the attachment member, and the specific configuration thereof will be described later in detail.

Figure 5:
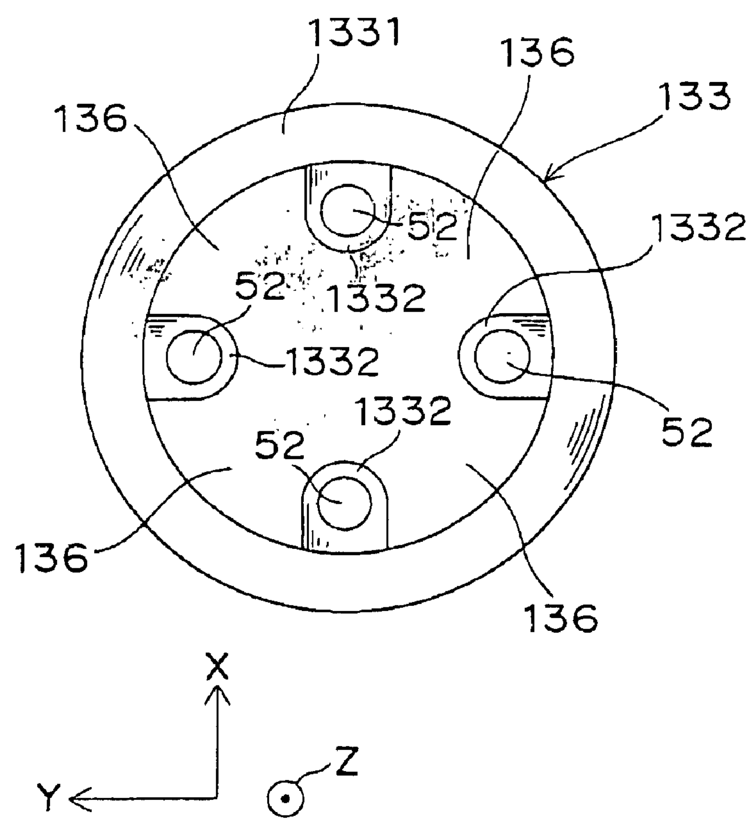
FIG. 5 is a diagram showing a configuration of a fixed side holding member.

As shown in FIG. 5, the fixed side holding member 133 includes a ring part 1331 formed in a ring shape and projections 1332 arranged at four locations. The projections 1332 hold the fixed side magnets 52, and are arranged at even intervals and concentrically. The fixed side holding member 133 is fixed to the main body 131 by a fixing screw 134. It is fixed in a direction in which the extending part 127 of the swinging member 3 is positioned between 136 the adjacent projections 1332, in the case where the fixed side holding member 133 is attached to the attachment member 2. Therefore, the positional relationship between the movable side magnet 51 held by the movable side holding part 128 of the swinging member 3 and the fixed side magnet 52 is such that they are arranged lined in the Z-axis direction or the vertical direction, respectively.

The movable side magnet 51 and the fixed side magnet 52 are fixed in a direction in which the attraction force acts with respect to each other for each pair. In the present embodiment, they are fixed such that the upper portions of all the magnets 51, 52 are the N poles, and the lower portions are the S poles. According to such an arrangement, even if the swinging member 3 rotates and swings with the supporting point as the center, it is corrected in the direction of returning the rotation by the attraction force of the magnets. The direction of the magnets may be different in the adjacent movable side magnet 51 and the fixed side magnet 52.

Figure 6:
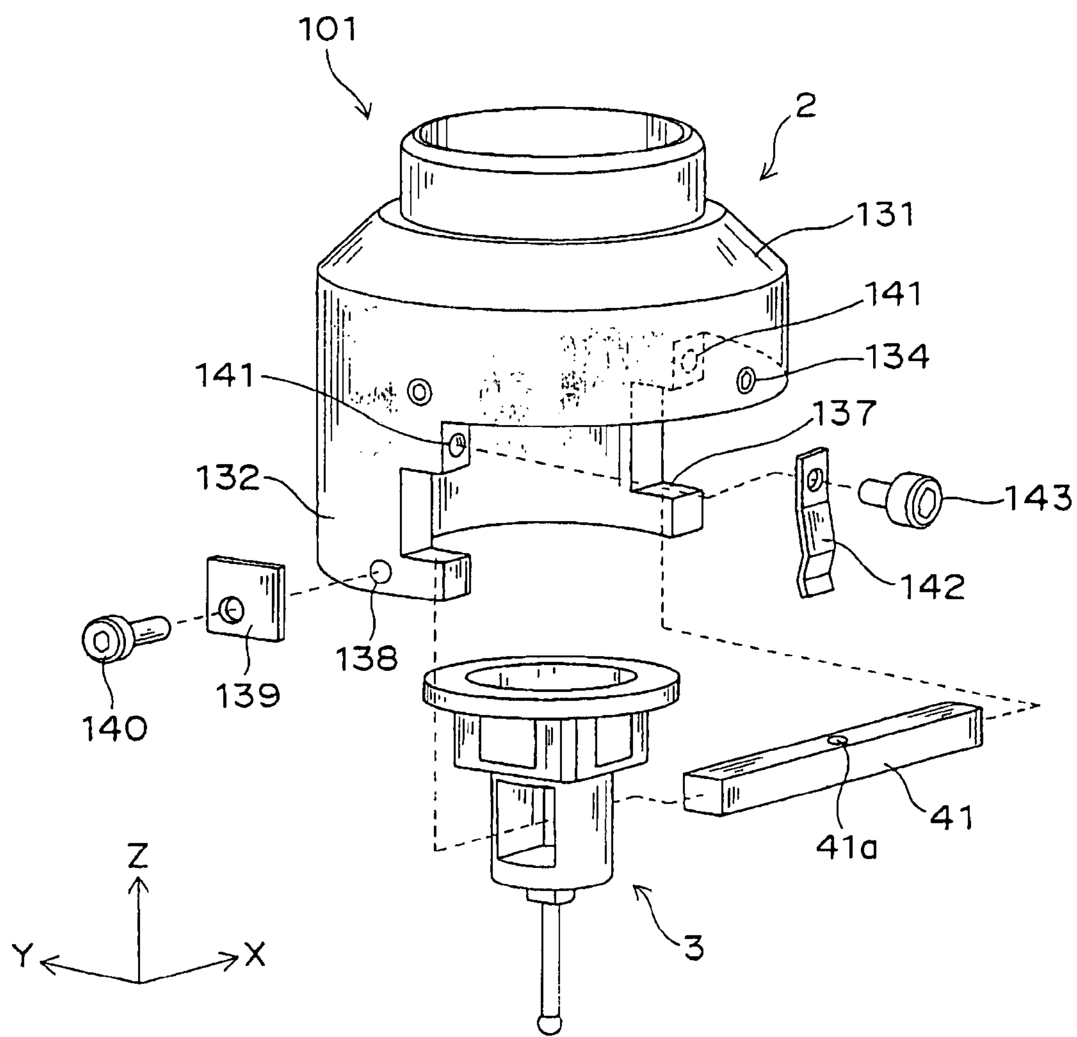
FIG. 6 is an assembly exploded perspective view of the shape measurement device probe of FIG. 1.

FIG. 6 is an assembly exploded perspective view of the shape measurement device probe shown in FIG. 1. In FIG. 6, the description on portions such as members present in plural is sometimes omitted for the sake of understanding the assembly structure. As described above, the swinging member 3 and the attachment member 2 are connected by passing the mounting platform 41 of the connecting mechanism 4 through the through hole 124 of the main body 125.

The mounting platform 41 is attached to the mounting platform attachment part 132 of the attachment member 2. The mounting platform attachment part 132 includes a cut-out 137 for fitting the mounting platform 41, and the mounting platform 41 connected with the swinging member 3 is mounted on the cut-out 137.

The mounting platform 41 is fixed by a first fixing member 139 to prevent a positional shift in the X axis direction. The first fixing member 139 is a plate-shaped member, and is fixed by an attachment screw 140 to be screwed into a fixing hole 138 formed in the mounting platform attachment part 132.

The mounting platform is fixed to the second fixing member 142 to prevent a position shift in the Y axis direction. The second fixing member 142 is a member in a plate spring form, and is fixed by an attachment screw 143 to be screwed into a fixing hole 141 formed in the mounting platform attachment part 132.

The probe 101 in the present embodiment configured as above operates in the following manner. According to such a configuration, the swinging member 3 receives force in the downward direction by the attraction force of the movable side magnet 51 and the fixed side magnet 52, and the distal end of the supporting point member 42 contacts the center of the circular cone-shaped groove 41*a* of the mounting platform 41 thereby preventing a positional shift, and the like. The swinging member 3 connected in a swinging manner to the attachment member 2 is biased so as to be at the neutral position at which the arm extends in the vertical direction by the attraction force of the movable side magnet 51 and the fixed side magnet 52. The swinging member 3 is swingable, but if the central axis of the swinging member 3 tilts, the distance between the movable side magnet 51 and the fixed side magnet 52 becomes larger and the restoring force acts in a direction of bringing the pair of magnets closer due to the properties of the magnet. Therefore, the restoring force acts in such a direction as to return the tilt in the entre swinging member 3. Similarly, the restoring force acts in such a direction as to return the rotation when the swinging member rotates with the supporting point as the center. Thus, the swinging member 3 is biased and orientation-maintained so that the extending direction of the arm coincides with the vertical direction during non-measurement time.

As described later, the shape measurement of the surface to be measured 61 of the measuring object 60 is performed by pressing the stylus 21 attached to the swinging member 3 against the surface to be measured 61 with predetermined pressing force. The swinging member 3 inclines by slightly moving the attachment member 2 towards the measuring object 60 side with the stylus 121 contacting the surface to be measured 61. The attraction force of the magnets acts on the swinging member 3 by the inclination. That is, the attraction force of the movable side magnet 51 and the fixed side magnet 52 generates pressing force to press the stylus 121 against the surface to be measured 61, and generates restoring force to restore the swinging member 3 to the neutral position in the initial state at which the swinging member 3 is not inclined and the arm of the swinging member 3 is extended in the vertical direction. As a result, the stylus 121 is pressed against the surface to be measured 61 at predetermined pressing force, that is, the measuring force. That is, during measurement time, the distal end of the stylus 121 contacts the measuring object while applying very small measuring force. As one example, the measuring force is 0.3 mN. The measuring force can be adjusted by the magnetic force of the movable side magnet 51 and the fixed side magnet 52 as well as the spacing therebetween.

In the present example, the strength of the magnets, the distance between the magnets, and the like are selected so that the displacement of distal end is 10 μm when the distal end of the stylus 121 is pressed at 0.3 mN. A method of applying constant measuring force to the distal end is as described later.

the shape measurement device equipped with the shape measurement device probe 101 having the configuration described above will be described below.

The shape measurement device generally measures and calculates the surface shape of the surface to be measured 61 based on the positional relationship between the probe and the reference plane using a laser length measuring instrument and a reference plane mirror by contacting the probe to the object to be measured and moving the probe along the surface to be measured 61 of the measuring object 60 while controlling the movement of the probe so that the contacting force becomes substantially constant.

Figure 7:
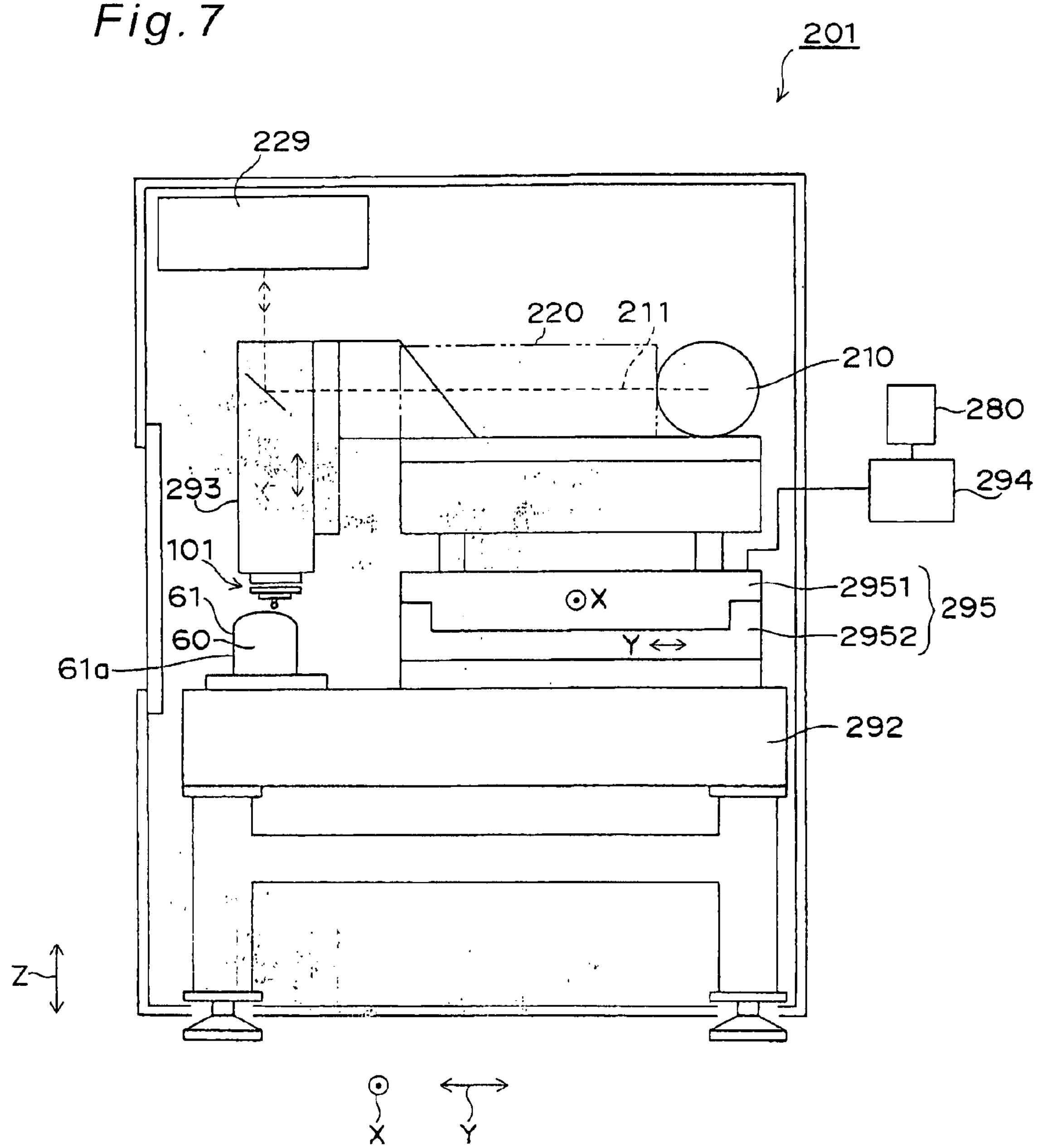
FIG. 7 is a diagram showing an example of a shape measurement device equipped with the probe shown in FIG. 1.
Figure 8:
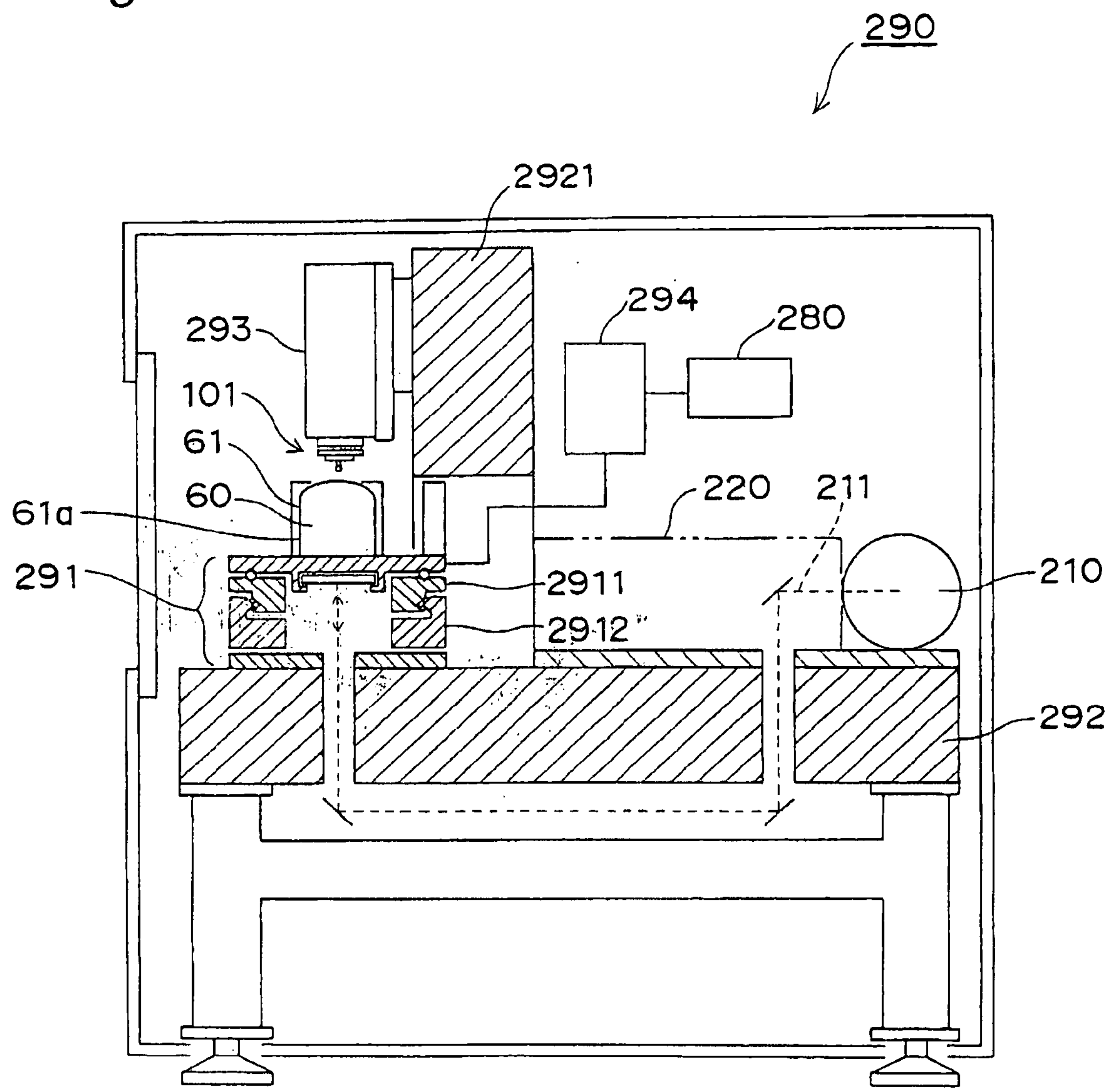
FIG. 8 is a diagram showing another example of a shape measurement device equipped with the probe shown n FIG. 1.

Such a shape measurement device includes a type mainly for measuring a relatively large measuring object having a size of, e.g. about 400 mm angle, which fixes the measuring object 60 in a base and moves the probe in all directions of X axis, Y axis, and Z axis, as shown in FIG. 7; and a type mainly for a medium or small measuring object having a size of, e.g., less than or equal to about 200 mm angle, which moves the stage mounted with the measuring object 60 in the X axis and axis directions, and moves only the probe in the Z axis direction, as shown in FIG. 8. The shape measurement device probe 101 described above is applicable to both types of measuring devices.

The shape measurement device 290 shown in FIG. 8 corresponds to the measuring device for medium and small measuring objects. In the shape measurement device 290, 291 denotes a stage, the stage 291 is mounted on a stone board 292, includes an X-stage 2911 and a Y-stage 2912 movable in the X axis and the Y axis directions orthogonal to each other on a plane, and further mounts the measuring object 60. 293 denotes a Z-table that enables the probe 101 to be movable in the Z axis direction, and is attached so as to be movable in the Z direction to a supporting column 2921 arranged upstanding on the stone board 292. 210 denotes a laser light generator for generating oscillation frequency stabilizing He-Ne laser light serving as measurement laser light 211 for obtaining positional information of the measurement point 61*a* of the surface to be measured 61. 220 denotes a measurement point information determining unit including an optical system for obtaining positional information of the measurement point 61*a* on the surface to be measured 61 using the laser light 211 generated in the laser light generator 210, and a known laser light length measuring unit for performing length measurement based on interference between the laser light from each reference plane in X axis, Y axis, and Z axis directions, and the laser light from the measurement point 61*a*. The measurement point information determining unit 220 will be specifically described later. 294 denotes a driving unit for driving the stage 291, and 280 denotes a control device. The control device 280 controls the driving unit 294 so that the swinging member 3 in the probe 101 inclines not only in a specific direction but swings in all directions when scanning the surface to be measured 61, and controls the movement direction and the movement amount of the stage 291.

The shape measurement device 201 shown in FIG. 7 has a configuration corresponding to the above-mentioned measuring device for a large measuring object. The components having the same or similar functions as the shape measurement device 290 are designated by the same reference numerals; and the description thereof will be omitted herein. 295 denotes a stage including an X-stage 2951 and a Y-stage 2952 installed on the stone board 292 and movable in the X axis and Y axis directions, and is mounted with the Z-table 293, the laser light generator 210, and the measurement point information determining unit 220. Thus, the stage 295 can move the Z-table 293, the laser light generator 210, and the measurement point information determining unit 220 in the X axis and Y axis directions. 229 denotes a reference mirror having a reference plane in the Z axis direction. In the present embodiment, the shape measurement device probe 101 is attached to the shape measurement device 201, and thus the shape measurement device 201 will be described below by way of example. However, the measuring operation of the surface to be measured 61 using the probe 101 in the shape measurement device 290 is no different from that in the shape measurement device 201.

Figure 9:
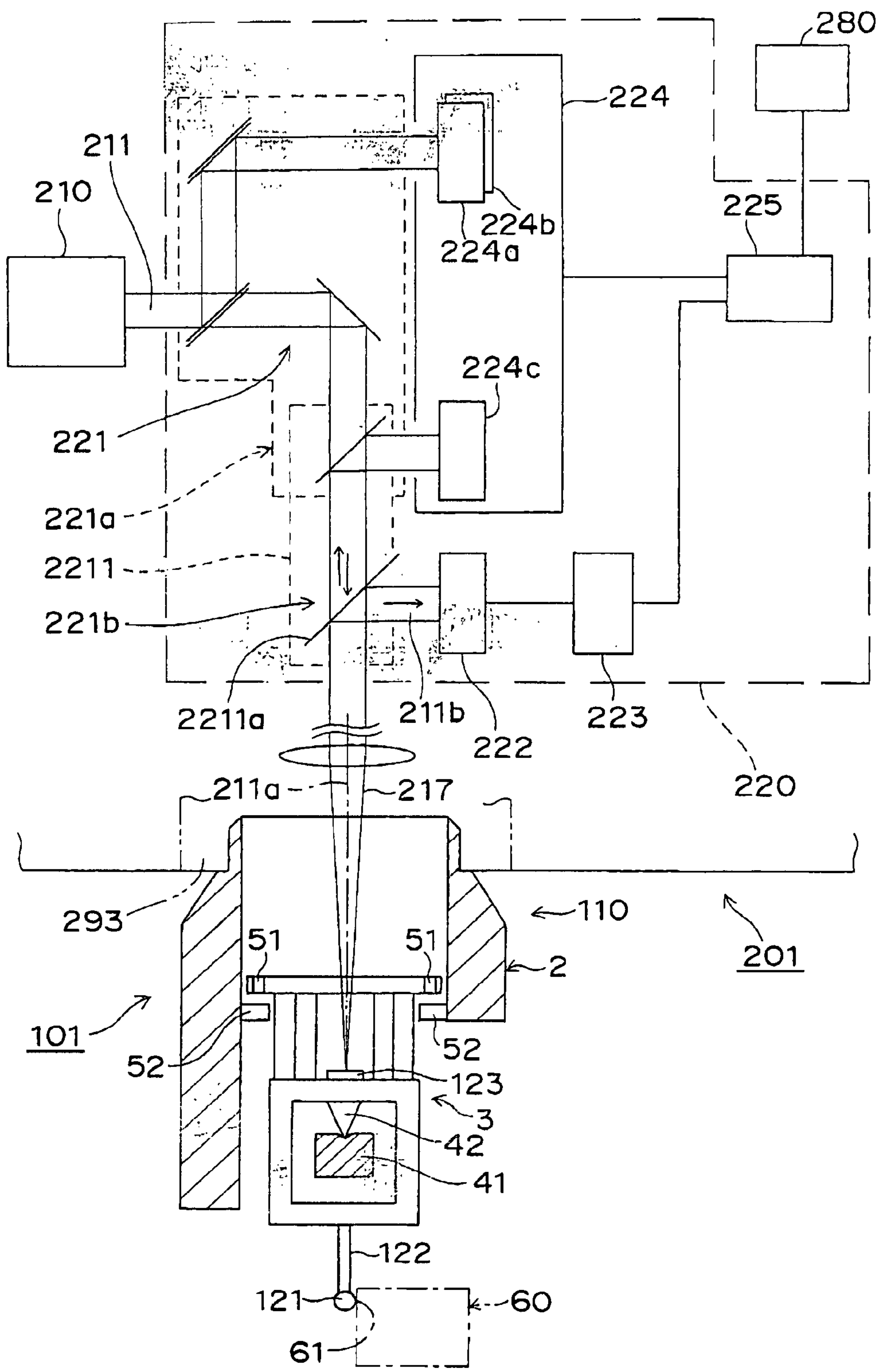
FIG. 9 is a diagram showing a configuration of a measurement point information determining unit arranged in the shape measurement device shown in FIG. 7.
Figure 10:
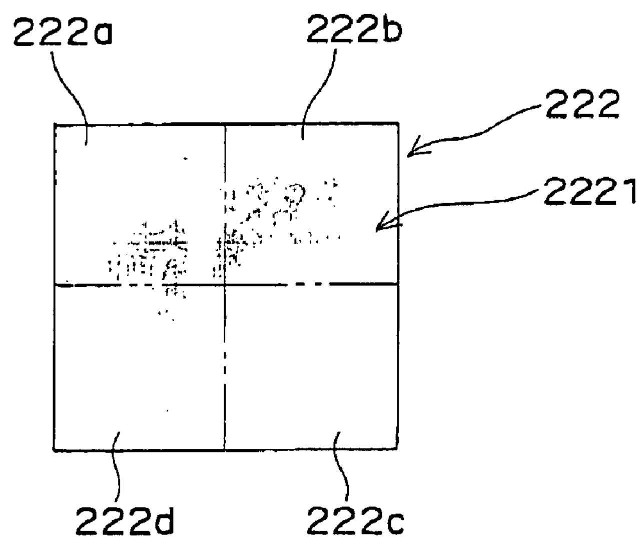
FIG. 10 is a plan view of an inclined angle detecting part arranged in the measurement point information determining unit shown in FIG. 9.

The measurement point information determining unit 220 will be specifically described with reference to FIG. 9 to FIG. 11. The measurement point information determining unit 220 includes an optical system 221 for obtaining positional information of the measurement point 61*a*, an inclined angle detecting part 222, a stylus position calculating part 223, a position coordinate measuring part 224, and an adder 225. The inclined angle detecting part 222, the stylus position calculating part 223, the position coordinate measuring part 224, and the adder 225 are portions corresponding to the laser length measuring unit, and are the components connected to the optical system 221 to actually obtain the positional information.

The measurement laser light 211 generated in the laser light generator 210 is divided into four divided lights by the optical system 221 to obtain three-dimensional coordinate position of the measurement point 61*a* of the surface to be measured 61. The optical system 221 thus includes a total of four optical systems of first optical systems 221*a* for X, Y, Z coordinates and a second optical system 221*b* for inclined angle of the swinging member. The first optical systems 221*a* include an X axis reference plate with a reference plane including a mirror plane orthogonal to the X axis direction and a Y axis reference plate with a reference plane including a mirror plane orthogonal to the Y axis direction (not shown) to detect the movement amount in the X axis direction and the Y axis direction of the stage 295, that is, the movement amount of the surface to be measured 61 in the X axis direction and the Y axis direction. Furthermore, there is also arranged a Z reference plate for detecting a so-called swell component to fit the stage 295 in the Z axis direction generated in the stage 295 during the movement of the stage 295. The reference plane of each reference plate is configured to a flatness of 0.01 micron order.

The shape measuring method of the surface to be measured 61 uses a known laser length measuring method of detecting the change in phase of the reflected laser light reflected at each reference plane by counting the interference signals of the laser light irradiated to each reference plane and the reflected laser light, e.g., as disclosed in Japanese Laid-Open Patent Publication No. 10-170243. In the laser length measuring method, the laser light irradiated to the reference planes is divided into reference light and measurement light by a branching member such as a prism, and the phases of the reference light and the measurement light tare shifted by 90 degrees, as disclosed in Japanese Laid-Open Patent Publication No. 4-1503, for example. The measurement light is irradiated to the reference plane and reflected thereby, the interference light due to the shift in phase of the returning reflected light and the reference light is electrically detected, and the distance between the reference point and the reference plane is measured based on the Lissajou's figure created from the obtained interference fringe signal.

The position coordinate measuring part 224 is a part that executes such a length measuring method, and includes detecting portions 224*a* to 224*c* for performing length measurement of the X coordinate value, Y coordinate value, and Z coordinate value at the measurement point 61*a* in the surface to be measured 61. In the present embodiment, since the stage 294 moves with respect to the measuring object 60 mounted on the stone board 292 as shown in FIG. 7, the X coordinate value, the Y coordinate value, and the Z coordinate value at the measurement point 61*a* can be referred to as a relative position coordinate values of the measurement point 61*a* with respect to the attachment member 2 in the probe 101 attached to the Z-table 293. The detecting portion 224*c* is a portion that performs length measurement of the Z coordinate value of the stylus 121 of the shape measurement device probe 101, and thus corresponds to one example functioning as a stylus position measurement instrument. The shape of the surface to be measured 61 is calculated in the position coordinate measuring part 224 and the adder 225 based on the detection result of the detecting portions 224*a* to 224*c* and the detection result obtained from the inclined angle of the swinging member 3 to be described later.

The second optical system 221*b* includes a light separator 2211 for guiding the reflected light of the measurement laser light 211 from the mirror 123 attached to the swinging member 3 of the shape measurement device probe 101 to the inclined angle detecting part 222.

The inclined angle detecting part 222 and the stylus position calculating part 223 will now be described. As shown in FIG. 9, some of the measurement laser light 211 is irradiated through a focus lens to the center point 123*a* of the mirror 123 attached to the swinging member 3 arranged in the shape measurement device probe 101 attached to the lower end of the Z-table 293. The irradiated laser light 211 is reflected by the mirror 123, and the reflected light 211*b* is irradiated to the inclined angle detecting part 222 by mirror 2211*a* arranged in the light separator 2211. The inclined angle detecting part 222 is configured by a light detector having a light receiving surface 2221 for receiving the reflected light 211*b* and converting the same to electrical signals, where the light receiving surface 2221 is partitioned into a plurality of light receiving regions for performing photoelectric conversion independently of each other. In the present embodiment, the light receiving surface 2221 is partitioned into four light receiving regions 222*a* to 222*d* in a lattice form, that is, a cross form. The number and shape of the light receiving regions are not limited to the illustrated form, and can be appropriately set based on the relationship with the measurement precision and the like.

During non-measurement time of the surface to be measured 61, the arm 122 of the probe 101 is arranged along the vertical direction. Thus, during non-measurement time, the reflected light 211*b* advances in parallel to the optical axis 211*a* of the measurement laser light 211 to be irradiated to the mirror 123 along the vertical direction, reflected by the mirror 2211*a*, and irradiated to the central portion of the light receiving surface 2221 of the inclined angle detecting part 222. The irradiating region of the reflected light 211*b* in the light receiving surface 2221 in this case is shown with the dotted line in FIG. 11 and set as a non-measurement time irradiating region 2222.

As described in the description of the shape measurement device probe 101, the measurement of the surface to be measured 61 is performed by pressing the stylus 121 against he surface to be measured 61 with substantially constant measuring force, and thus the swinging member 3 of the probe 101 inclines with respect to the attachment member 2, as described above. Thus, the reflected light 211*b* intersects the optical axis 211*a* and advances to the mirror 2211*a*, and irradiated to a reference irradiating region 2223 deviated from the central portion in the light receiving surface 2221 of the inclined angle detecting part 222. During measurement time, the swinging member 3 can swing in any direction without being limited to a specific direction with the pointed end of the supporting point member 42 as the supporting point, as described above. Thus, if minute bumps in nano order to be measured are not present on the surface to be measured 61, the reference irradiating region 2223 will be positioned along a circumference 2224 of a circle having a constant radius with the center point 2221*a* of the light receiving surface 2221 as the center, as shown in FIG. 11.

The inclined angle detecting part 222 generates the electric signal in accordance with the irradiation of the reflected light 211*b* to the light receiving surface 2221, but since the light receiving surface 2221 is partitioned into the four light receiving regions 222*a* to 222*d*, the inclined angle of the swinging member 3 can be detected from the irradiated location of the reflected light 211*b*. That is, assuming that the light receiving region 222*a* is [A], the light receiving region 222*b* is [B], the light receiving region 222*c* is [C], and the light receiving region 222*d* is [D], the inclined angle of the swinging member 3 in the X axis direction can be obtained through (A+B)−(C+D), and the inclined angle in the Y axis direction can be obtained through (A+D)−(B+C) for the electric signals obtained from each light receiving region 222*a* to 222*d*. Thus, the inclined angle detecting part 222 performs (A+B)−(C+D) and (A+D)−(B+C) for the electric signals obtained from each light receiving region 222*a* to 222*d*, and sends the same to the stylus position calculating part 223 as angle signals.

The stylus position calculating part 223 converts the angle signal to the displacement amount of the stylus 121 arranged in the probe 101.

Figure 11:
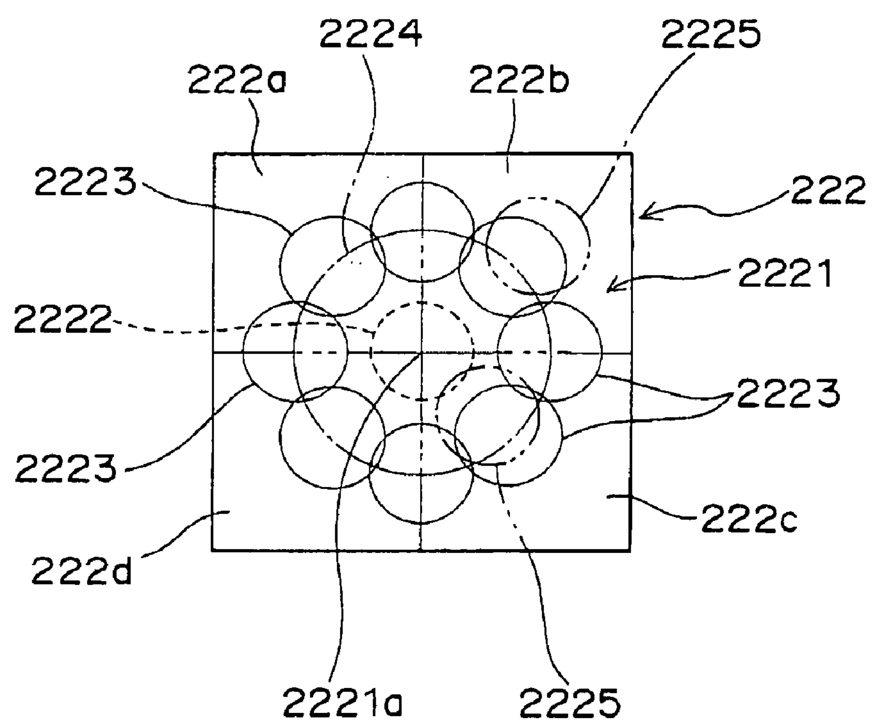
FIG. 11 is a diagram for explaining a state in which reflected light from the probe is irradiated to the inclined angle detecting part.

Since minute bumps are actually present on the surface to be measured 61, the reflected light 211*b* is irradiated to a position deviated from the circumference 2224 in correspondence to the minute bumps, as shown in FIG. 11 as displaced irradiating region 2225. Similar to the reference irradiating region 2223, the inclined angle detecting part 222 sends the angle signal by the irradiation of the reflected light 211*b* to the displaced irradiating region 225, and the stylus position calculating part 223 obtains the displacement amount corresponding to the minute bumps at the stylus 121. Therefore, the size of the minute bumps can be obtained by obtaining the difference between the reference displacement amount of the stylus 121 corresponding to the reference irradiating region 2223 and the bump displacement amount corresponding to the displaced irradiating region 2225.

Figure 12:
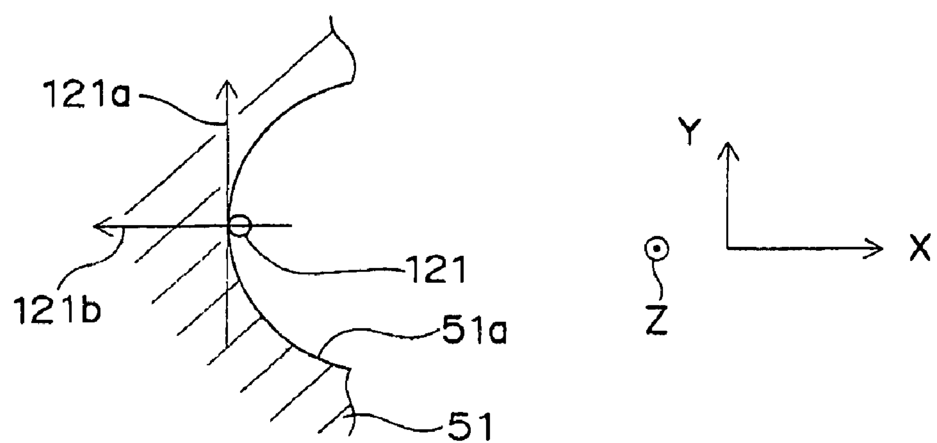
FIG. 12 is a diagram for explaining an inclined angle of the probe when measuring a surface to be measured with the probe shown in FIG. 1, the measuring object shown in a plan view.
Figure 13:
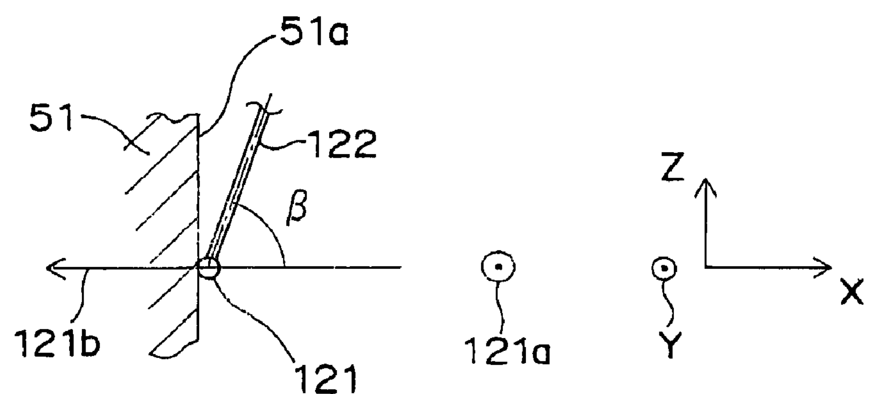
FIG. 13 a diagram for explaining an inclined angle of the probe when measuring a surface to be measured with the probe shown in FIG. 1, the measuring object shown in a side view.

As a premise of the measuring method, the reference displacement amount must be made constant or substantially constant in the configuration in which the swinging member 3 can oscillate and incline in any direction with the pointed end of the supporting point member 42 as the supporting point. That is, since the swinging member 3 swings in any direction, the irradiating region of the reflected light 211*b* in the light receiving surface 2221 moves, e.g., along the circumference 2224 during measurement time. In such a state, the reflected light 211*b* is basically always irradiated to the reference irradiating region 2223, that is, the include angle $\alpha$ of the swinging member 3 must be made constant or substantially constant even if the swinging member 3 swings in any direction. Therefore, during measurement time, the driving unit 294 of the stage 295 is controlled in the control device 280 to control the movement amount and the movement direction of the stage 295 so that the tilt $\beta$ of the swinging member 3 with respect to the direction 121*b* perpendicular to the scanning direction 121*a* of the stylus 121 becomes constant, thereby correcting the scanning direction 121*a*, as shown in FIGS. 12 and 13.

The size of the minute bump at the measurement point 61*a* of the surface to be measured 61 is obtained in the stylus position calculating part 223 in such a manner, and at the same time, the X coordinate value, the Y coordinate value, and Z coordinate value at the measurement point 61*a* are obtained in the position coordinate measuring part 224, as described above. Thus, the adder 225 adds the X coordinate value, the Y coordinate value, and the Z coordinate value at the measurement point 61*a* obtained in the position coordinate measuring part 224 with the size of the minute bump at the measurement point 61*a* obtained in the stylus position calculating part 223 to obtain a measurement X coordinate value, a measurement Y coordinate value, and a measurement Z coordinate value at the measurement point 61*a* taking the amount of minute bump into consideration.

Assuming the X coordinate value, the Y coordinate value, and the Z coordinate value at the measurement point 61*a* obtained in the position coordinate measuring part 224 as X1, Y1, and Z1, and the X coordinate value of the size of the minute bump at the measurement point 61*a* obtained in the stylus position calculating part 223 as (A+B)−(C+D) and the Y coordinate as (A+D)−(B+C), the measurement X coordinate value, the measurement Y coordinate value, and the measurement Z coordinate value obtained in the adder 225 will be $X1+E\{(A+B)-(C+D)\}$, $Y1+F\{(A+D)-(B+D)\}$, and Z1. Here, E and F are correction coefficients.

Furthermore, since the stylus 121 has a spherical shape as shown in the figure, the measurement X coordinate value, the measurement Y coordinate value, and the measurement Z coordinate value are central coordinates of the stylus 121. Therefore, the true coordinate value of the measurement point 61*a* is a value shifted by a radius value of the stylus 121 in the direction perpendicular to the scanning direction of the probe 101.

The operation in the shape measurement device 201 configured as above, that is, the shape measuring method with respect to the surface to be measured 61 of the measuring object 60 will now be described. As described in the description of the shape measurement device probe 101, the surface to be measured 61 that can be measured in the shape measurement device 201 attached with the probe 101 is a surface to be measured having an angle between 0 degree to a maximum of about 30 degrees at the intersection angle θ of the tangential direction and the perpendicular direction at the surface to be measured 61*a*. the shape measuring method is executed in the operation control of the control device 280.

The stage 295 including the Z-table 293 attached with the probe 101 is relatively arranged with respect toe h measuring object 60 so as to contact the stylus 121 to the surface to be measured 61, and so that the stylus 121 presses against the surface to be measured 61 with the measuring force of bout 0.3 mN (=30 mgf). The reflected light 211*b* is thereby irradiated to the reference irradiating region 2223 in the light receiving surface 2221 of the inclined angle detecting part 222, and the X coordinate value, the Y coordinate value, and the Z coordinate value that serve as references at the measurement point 61*a* of the surface to be measured 61 are obtained by the adder 225 through the stylus position calculating part 224 and the position coordinate measuring part 224, as described above.

For instance, taking a case in which the measuring object 60 has a cylindrical shape and one round of the outer peripheral surface thereof is to be measured, the driving unit 294 of the stage 295 is controlled in the control device 280 to control the movement amount and the movement direction of the stage 295 in the X axis direction and the Y axis direction so that the tilt β of the swinging member 3 with respect to the perpendicular direction 121*b* shown in FIGS. 12 and 13 is maintained constant or substantially constant, that is, the swinging member 3 is inclined in any direction and the tilt α of the swinging member 3 with respect to the vertical direction is maintained constant or substantially constant. In the present embodiment, the measuring force is maintained at 30 mgf by adjusting to the angle at which the displacement of the distal end of the stylus 121 is maintained at 10 μm.

Therefore, the measurement of the surface to be measured 61 is carried out for the entire periphery of the surface to be measured 61 by having the swinging member 3 perform a so-called oscillating movement or circling movement. Thus, the reflected light 211*b* makes one round along the circumference 2224 of each light receiving region 222*a* to 222*d* in the light receiving surface 2221 of the inclined angle detecting part 222. At this time, the irradiating region of the reflected light 211*b* moves from the reference irradiating region 2223 to the displaced irradiating region 225 according to the bumps of the surface to be measured 61.

The measurement X coordinate value, the measurement Y coordinate value, and the measurement Z coordinate value including the bumps at the measurement point 61*a* of the surface to be measured 61 are obtained by the adder 225 through the stylus position calculating part 223 and the position coordinate measuring part 224 based on such a measuring operation, as described above.

Therefore, according to the shape measurement device probe 101 in the above configuration, the swinging member 3 that can be inclined in any horizontal direction is held at the neutral position in a non-contacting manner using the magnetic force by the magnets and the force with which the stylus 121 presses against the measuring object 60, that is, the measuring force, is produced in an extremely small amount, and thus an error in the extremely small force caused by the contacting force such as the coil spring is small and damages by accidental impact are less likely to occur. Furthermore, the positional shift of the supporting point is less likely to occur due to the configuration of pressing down the supporting point member 42 configured by the circular cone-shaped groove 41*a* and the pointed end of the connecting mechanism 4 by the attraction force of the movable side magnet 9 and the fixed side magnet 11. Thus in the present probe 101, the axis of the stylus 121 is not limited to the vertical direction, and the stylus 121 can be used in a tilted state. Since current does not need to be applied as in the electromagnet, the configuration is simple, and there is no influence by electric heat.

In the present embodiment, the attraction force by the movable side magnet 9 and the fixed side magnet 11 is used, but the same effect can still be obtained even if one of either the fixed side or the movable side is not a magnet but a magnetic body.

Figure 14:
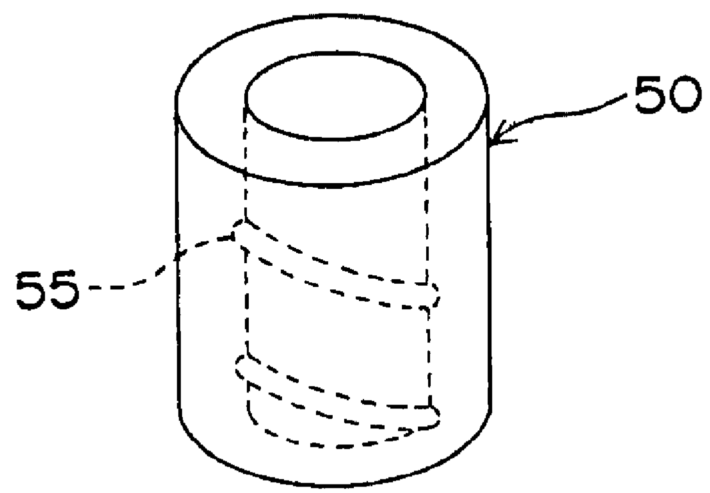
FIG. 14 is a perspective view of an example of a measuring object that can be measured with the probe shown in FIG. 1.
Figure 15:
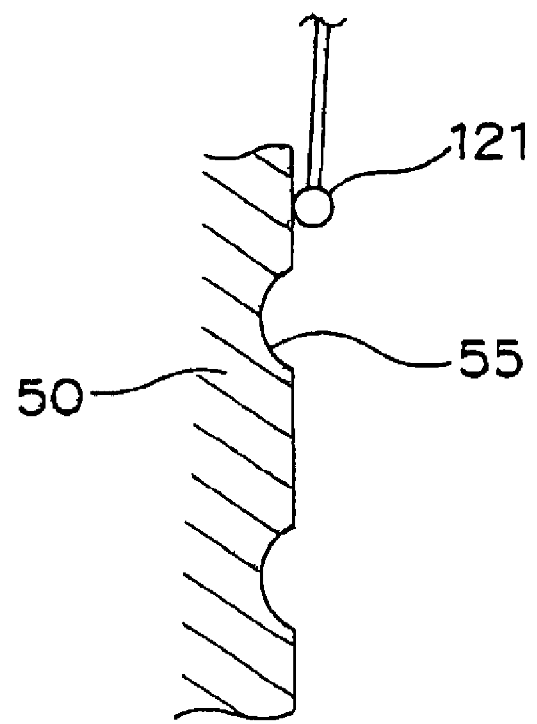
FIG. 15 is a cross sectional view of the measuring object shown in FIG. 14.

According to he shape measurement device 201 of the present embodiment, the swinging member 3 including the stylus 121 in the probe 101 can perform a so-called oscillating movement or circling movement. Therefore, when measuring, e.g., the inner peripheral surface of the measuring object 60, the inner peripheral surface can be measured by moving the probe 101 in the Z axis direction and the Y axis direction without rotating the measuring object 60. Therefore, the shape measurement becomes possible regardless of the inclined direction of the side surface of the measuring object 60 without adopting a complex configuration in the measuring device. Furthermore, since the measuring object 60 need not be rotated, problem of producing a core shift of the central axis of the measuring object 60 does not occur, and a measurement error of the surface to be measured can be reduced. Therefore, the outer diameter, hole diameter and the like of the lens can be measured, the shape of a groove part 55 formed in the measuring object 60 such as a fluid bearing shown in FIGS. 14 and 15 and accommodating lubricant agent can be measured. Therefore, the shape measurement device 201 widely contributes to the development of industry advancing towards preciseness and miniaturization.

In the shape measurement device 201, the measuring object 60 is fixed on the stone board 292 and the probe 101 is moved in the Z, Y, Z axes directions, but the probe 101 may be fixed and the measuring object 60 may be moved. In other words, the measuring object 60 and the probe 101 merely need to be relatively moved.

A shape measurement device probe used in a shape measurement device according to a second embodiment of the present invention will now be described. A shape measurement device probe 101*a* according to the present embodiment has substantially the same configuration as the shape measurement device probe 101 according to the first embodiment, and thus different aspects will be mainly described.

Figure 16:
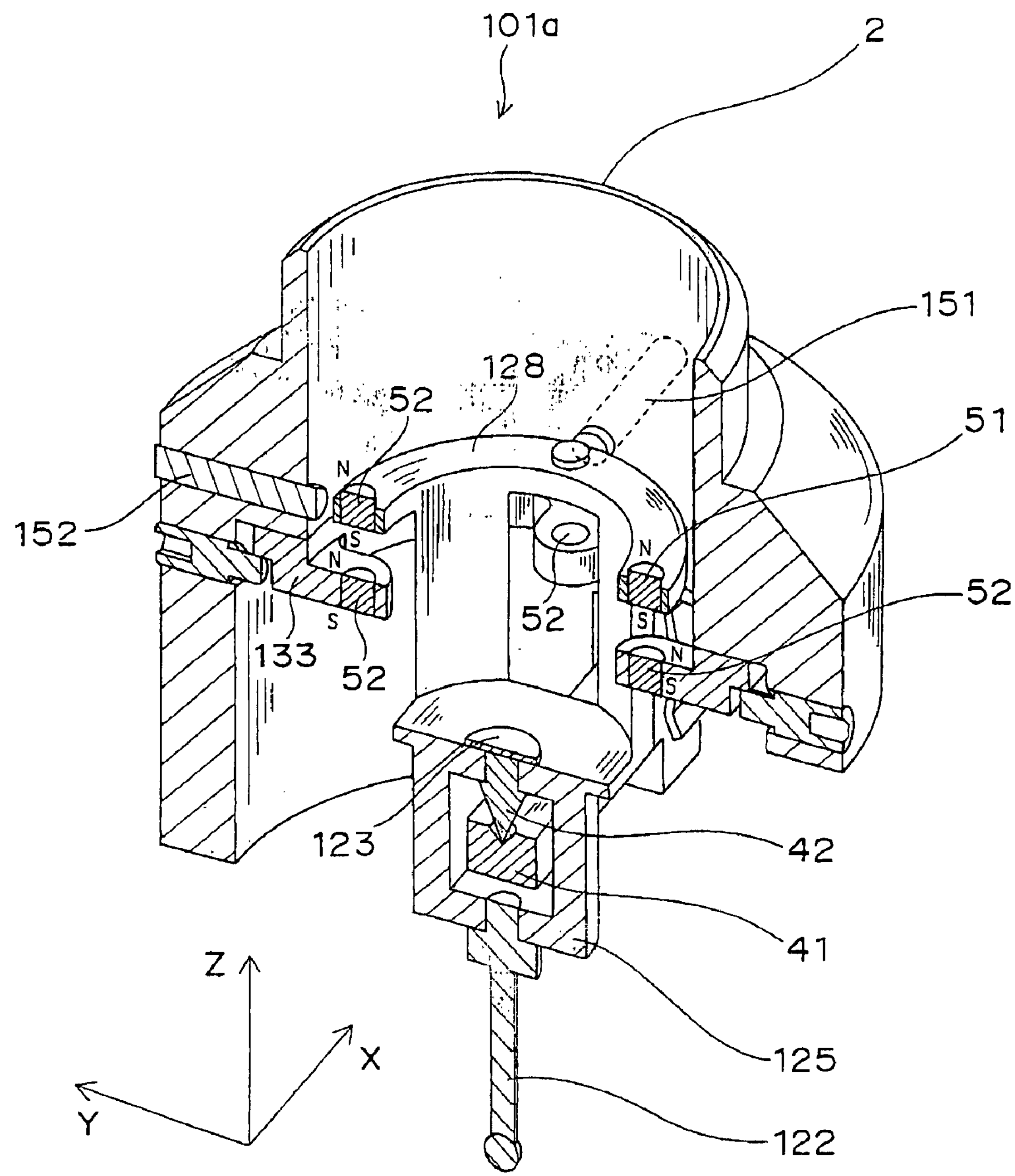
FIG. 16 is a perspective view when a shape measurement device prove used in a shape measurement device according to a second embodiment of the present invention is cut at a symmetric plane.

FIG. 16 is a perspective view when the shape measurement device probe according to the second embodiment of the present invention is cut at a symmetric plane. In FIG. 16, contactless displacement sensors 151, 152 are arranged to detect the tilt of the swinging member 3. A capacitance type may be used as the type of the sensor. The contactless displacement sensors 151, 152 are arranged in the main body 131 of the attachment member 2, and the distance with the movable side holding part 128 of the swinging member 3 is measured. The movable side holding part 128 is at a position more distant than the supporting point member and has a large displacement amount with respect toe the tilt of the swinging member 3, and thus the distance between the contactless displacement sensors 151, 152 and the movable side holding part 128 can be measured with higher precision.

The contactless displacement sensors 151, 152 are arranged to form an angle of 90° with respect to the center of the swinging member 3, whereby the tilt of the swinging member 3 in the X direction and the Y direction with the supporting point as the center can be measured.

The titled amount of the swinging member 3 is in a range where the side surface of the movable side holding part 128 contacts the distal ends of the contactless displacement sensors 151, 152. The contactless displacement sensors 151, 152 thus also function as regulating members for regulating the swinging width of the swinging member 3.

Figure 17:
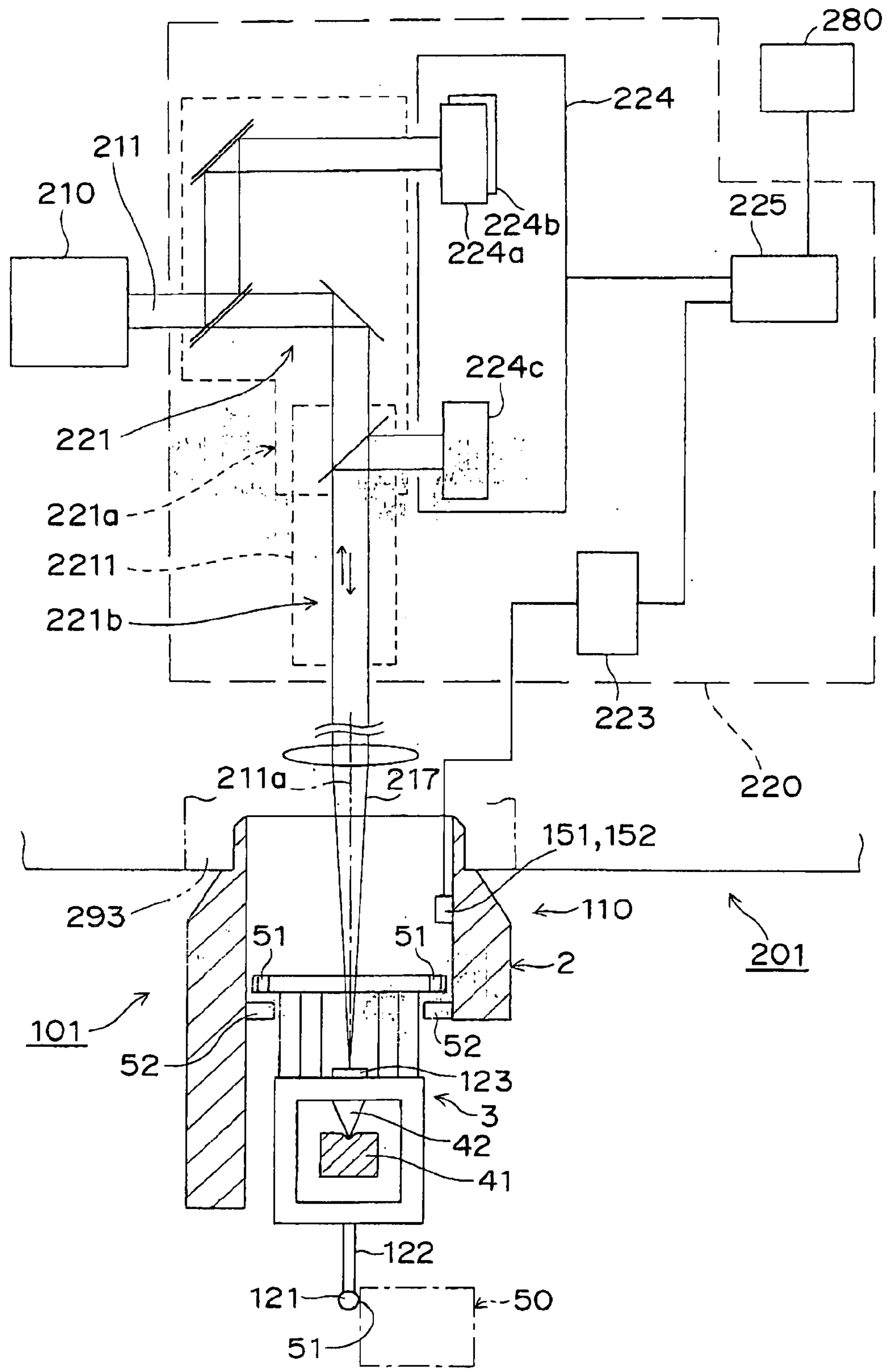
FIG. 17 is a diagram showing a configuration of a measurement point information determining unit arranged in the shape measurement device equipped with the probe shown in FIG. 16.
Figure 18A:
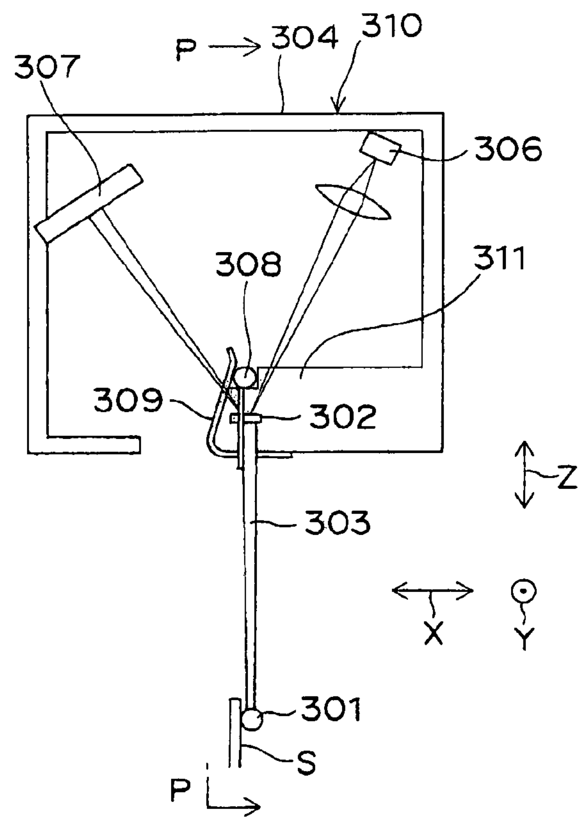
FIG. 18A is a side view of a probe arranged in a conventional shape measurement device disclosed in patent document 1.
Figure 18B:
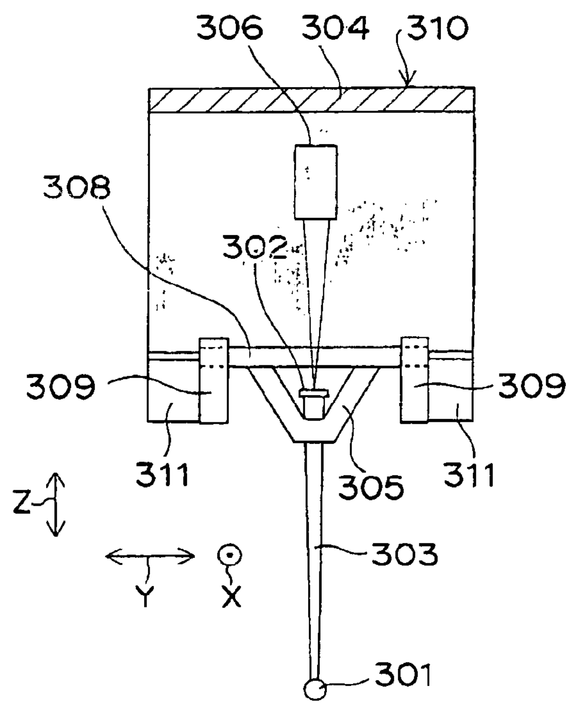
FIG. 18B is a front view of the probe arranged in the conventional shape measurement device disclosed in patent document 1.
Figure 19:
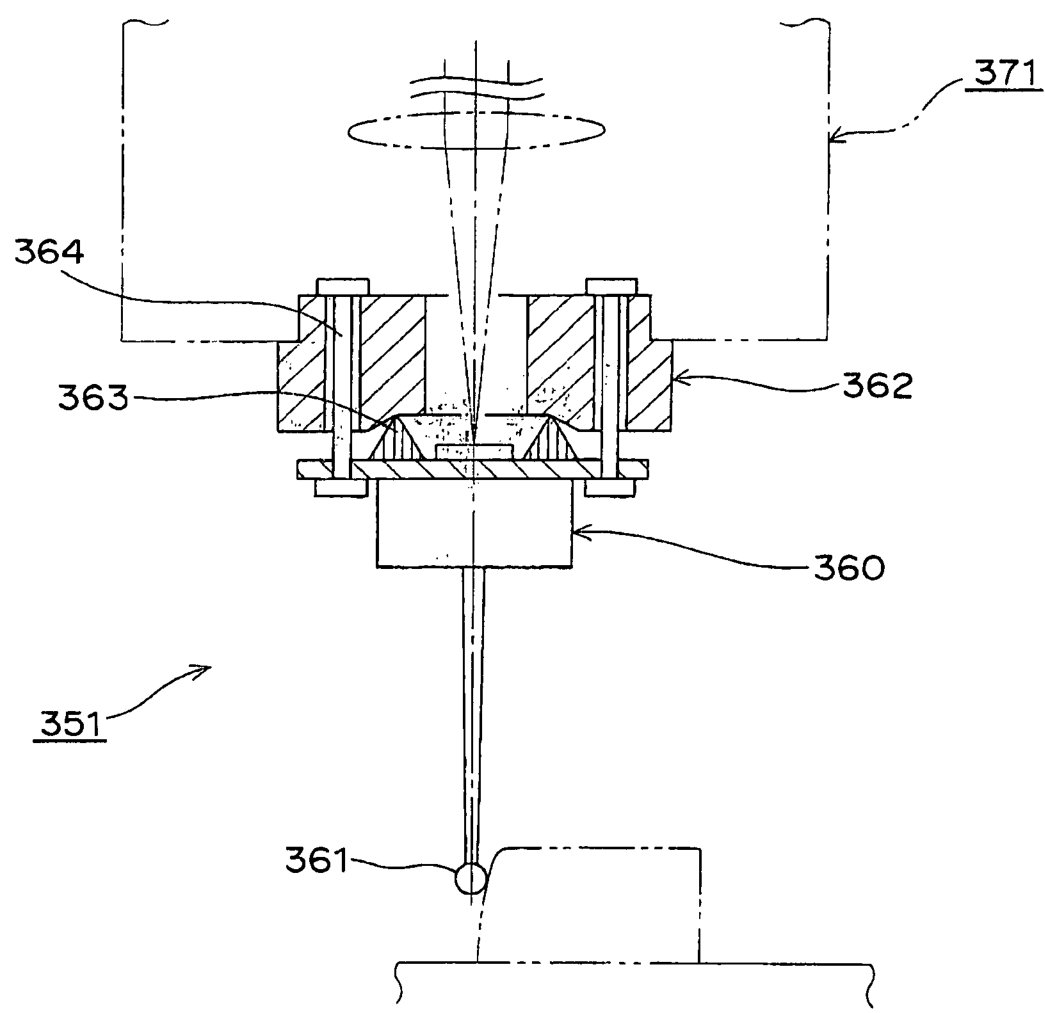
FIG. 19 is a diagram showing a configuration of another conventional shape measurement device.
Figure 20:
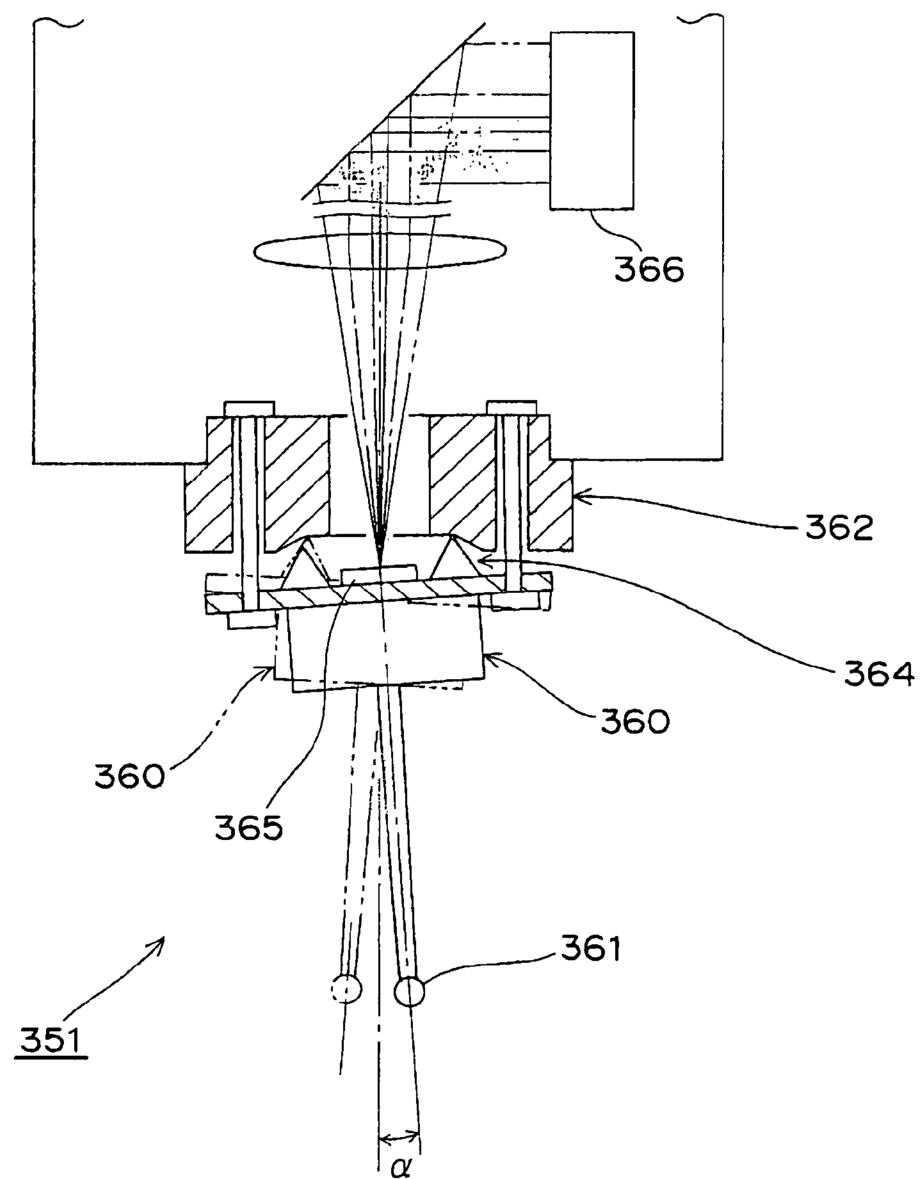
FIG. 20 is a diagram showing an inclined state of a swinging member of the shape measurement device of FIG. 19.

FIG. 17 is a diagram showing a configuration of a measurement point information determining unit arranged in the shape measurement device equipped with the probe shown in FIG. 16. The shape measurement device according to the present embodiment has substantially the same configuration of the measurement point information determining unit shown in FIG. 9, but differs in the configuration of the inclined angle detecting part.

The inclined angle detecting part according to the present embodiment includes the contactless displacement sensors 151, 152 as the configuration of the shape measurement device probe, where the tilt of the swinging member 3 is non-optically detected by the sensors 151, 152. That is, the contactless displacement sensors 151, 152 function as the inclined angle detecting part 222 in FIG. 9. That is, since the inclined angle of the swinging member 3 is not optically measured as in the inclined angle detecting part in the first embodiment, the mirror 2211*a* for guiding the reflected light is unnecessary.

In addition to the effect of the shape measurement device according to the first embodiment, the configuration of the optical system can be simplified in the shape measurement device according to the present embodiment, since the inclined angle of the swinging member 3 is not optically detected, as described above.

The present invention is not limited to the above embodiments, and may also be implemented in various other modes. in the above embodiments, the supporting point member is a member arranged in a projecting manner, so that the distal end of the projection fits into the circular cone-shaped groove, but a member in the projection form may be arranged upward on the mounting platform and the circular cone-shaped groove arranged in the swinging member may be used as a supporting point member.

INDUSTRIAL APPLICABILITY

The present invention is applicable to a shape measurement device for performing scan-measuring with high precision and low measuring force of the measurement of the inner surface or the hole diameter of a hole having any shape and the shape measurement of the external surface having any shape, and a probe arranged in the shape measurement device.

The respective effect can be exhibited by appropriately combining any embodiment of the various embodiments described above. Although the present invention has been sufficiently described in its preferred form with reference to the accompanying drawings, various modifications and changes should be apparent to those skilled in the art. Such modifications and changes should be recognized as being made in the invention without departing from the scope thereof defined by the appended claims.

The invention claimed is:

1. A shape measurement device probe comprising:

a measuring surface contacting unit including an arm and a stylus, the stylus being arranged at a distal end of the arm and contacting a surface to be measured of a measuring object;

an attachment member for attaching the measuring surface contacting unit to the shape measurement device;

a connecting mechanism including a supporting point member arranged in the measuring surface contacting unit and a mounting platform fixed to the attachment member and to be mounted with the supporting point member, for connecting the measuring surface contacting unit and the attachment member in a swinging manner with the supporting point member as a supporting point; and a biasing mechanism including a movable side member arranged on the measuring surface contacting unit and a fixed side member arranged on the attachment member, the movable side member and the fixed side member being arranged to face each other in a vertical direction and configured to generate magnetic attraction force in a non-contacting state, the biasing mechanism biasing the measuring surface contacting unit such that the arm is directed in the vertical direction by the magnetic attraction force.

2. The shape measurement device probe according to claim 1, wherein one of the movable side member and the fixed side member is configured by a permanent magnet and the other is configured by a magnetic body.

3. The shape measurement device probe according to claim 1, wherein both the movable side member and the fixed side member are configured by permanent magnets, and are arranged such that different poles face each other.

4. The shape measurement device probe according to claim 1, wherein the supporting point member is configured as a projection of a needle shape, and the mounting platform includes a circular cone-shaped groove into which a distal end of the supporting point member is fitted, the measuring surface contacting unit and the attachment member being connected in a swinging manner with a contacting portion of a deepest portion of the circular cone-shaped groove and a pointed end of the supporting point member as a center of the swing.

5. The shape measurement device probe according to claim 1, wherein the measuring surface contacting unit includes a main part provided with a through hole extending in a lateral direction at the middle, the arm being fixed to a lower wall on an outer side of the main part and the supporting point member being suspended from an upper wall on an inner side in the through hole of the main part, and the mounting platform extends through the through hole.

6. The shape measurement device probe according to claim 1, wherein the measuring surface contacting unit includes an extending part extending to a side opposite to the stylus with respect to the supporting point member, and a movable side holding part arranged at a distal end of the extending part, for holding the movable side member, and the attachment member includes, on an internal surface of a tubular main body, a fixed side holding part arranged on the same side as the supporting point member with respect to the movable side holding part, for holding the fixed side member.

7. The shape measurement device probe according to claim 6, wherein the movable side holding part is configured into a ring shape and holds a plurality of movable side members at intervals at a lower surface side, and the fixed side holding part holds a plurality of fixed side members correspondence to each movable side member at a position facing each movable side member in the vertical direction.

8. The shape measurement device probe according to claim 1, wherein the attachment member includes a regulating member for regulating a swinging width of the measuring surface contacting unit by contacting the measuring surface contacting unit on an internal surface of the tubular main body.

9. A shape measurement device comprising:

the shape measurement device probe according to claim 1, including a mirror for reflecting measurement laser light at the measuring surface contacting unit of the shape measurement device probe;

a laser light generator for generating the measurement laser light irradiated to the shape measurement device probe to obtain positional information of a measurement point at a surface to be measured of a measuring object; and a measurement point information determining unit for detecting an inclined angle of the measuring surface contacting unit of the shape measurement device probe based on reflected light reflected by the mirror arranged in the shape measurement device probe.

10. The shape measurement device according to claim 9, wherein the measurement point information determining unit includes an inclined angle detecting part for detecting the inclined angle, a stylus position calculating part for converting an angle signal obtained from the inclined angle detecting part to a displacement amount of the stylus with respect to the attachment member arranged in the shape measurement device probe, a position coordinate measuring part for obtaining a relative position coordinate value of the measurement point with respect to the attachment member using the measurement laser light, and an adder for adding the displacement amount of the stylus relative position coordinate value and obtaining positional information of the measurement point.

11. The shape measurement device according to claim 10, wherein the inclined angle detecting part includes a light detector for receiving the reflected light, the light detector including one light receiving surface divided into a plurality of light receiving regions for independently performing photoelectric conversion.

12. A shape measurement device comprising:

the shape measurement device probe according to claim 1, a plurality of position detecting sensors arranged on an internal surface of the cylindrical main body of the attachment member, for detecting a distance with measuring surface contacting unit; and a measurement point information determining unit for detecting an inclined angle of the measuring surface contacting unit of the shape measurement device probe based on an output from the plurality of position detecting sensors and obtaining positional information of the measurement point.

13. The shape measurement device according to claim 12, wherein the position detecting sensors are arranged at two locations so as to form an angle of 90° with respect to a center position of the main body of the attachment member.

* * * * *